US012773360B2

(12) United States Patent
Thomas et al.

(10) Patent No.: US 12,773,360 B2
(45) Date of Patent: Oct. 27, 2026

(54) PATIENT SUPPORT APPARATUSES WITH PORTABLE ELECTRONIC DEVICE CHARGING

(71) Applicant: Stryker Corporation, Kalamazoo, MI (US)

(72) Inventors: Madhu Thomas, London (CA); Krishna Sandeep Bhimavarapu, Kalamazoo, MI (US); Jerald A. Trepanier, Augusta, MI (US); Brianna Graves, Paw Paw, MI (US)

(73) Assignee: Stryker Corporation, Portage, MI (US)

(*) Notice: Subject to any disclaimer, the term of this patent is extended or adjusted under 35 U.S.C. 154(b) by 0 days.

(21) Appl. No.: 18/724,263

(22) PCT Filed: Jun. 1, 2023

(86) PCT No.: PCT/US2023/024154
§ 371 (c)(1),
(2) Date: Jun. 26, 2024

(87) PCT Pub. No.: WO2023/235491
PCT Pub. Date: Dec. 7, 2023

(65) Prior Publication Data

US 2025/0082525 A1 Mar. 13, 2025

Related U.S. Application Data

(60) Provisional application No. 63/348,662, filed on Jun. 3, 2022.

(51) Int. Cl.
*A61G 7/05* (2006.01)
*H02J 7/60* (2026.01)
*H02J 50/70* (2016.01)

(52) U.S. Cl.
CPC .............. *A61G 7/0524* (2016.11); *H02J 7/60* (2026.01); *H02J 50/70* (2016.02); *A61G 2203/30* (2013.01); *A61G 2203/70* (2013.01)

(58) Field of Classification Search
CPC ...... A61G 7/05; A61G 7/0507; A61G 7/0509; A61G 7/0524; A61G 2203/30;
(Continued)

(56) References Cited

U.S. PATENT DOCUMENTS 8,143,846 B2 * 3/2012 Herman ............... A61G 7/0514 320/108
9,375,374 B2 * 6/2016 Herman ............... A61G 7/0514
(Continued)

FOREIGN PATENT DOCUMENTS

CN 108186232 A 6/2018
GB 2596613 A 1/2022
WO 2021138176 A1 7/2021

OTHER PUBLICATIONS

International Search Report for Application No. PCT/US2023/024154 dated Sep. 20, 2023, 3 pages.
(Continued)

*Primary Examiner* — David R Hare
(74) *Attorney, Agent, or Firm* — Howard & Howard Attorneys PLLC

(57) ABSTRACT

A patient support apparatus is disclosed that includes a support structure including a patient support deck defining a patient support surface, a charging interface, a sensor system coupled to the support structure, and a controller disposed in communication with the sensor system. The charging interface is operable between a first charge state for charging portable electronic devices where the charging interface generates an electromagnetic field and a second charge state where the charging interface at least partially limits generation of the electromagnetic field. The sensor system gener-
(Continued)

ates data representing changes in patient position on the support structure relative to a patient safety zone defined spaced from the charging interface. The controller is configured to change operation of the charging interface in response to the data generated by the sensor system indicating a sensed patient position outside the patient safety zone to at least partially reduce the electromagnetic field.

20 Claims, 19 Drawing Sheets

(58) Field of Classification Search
CPC .......... A61G 2203/70; H02J 7/42; H02J 7/60; H02J 7/70; A61B 5/1036; A61B 5/1115; A61B 2562/0252
USPC .......................................... 5/428, 503.1, 600
See application file for complete search history.

(56) References Cited

U.S. PATENT DOCUMENTS

| | | | | |
|---|---|---|---|---|
| 9,402,545 | B2 * | 8/2016 | Baker | A61B 5/0002 |
| 10,123,925 | B2 * | 11/2018 | Herman | A61G 7/0524 |
| 10,172,753 | B2 | 1/2019 | Tessmer et al. | |
| 10,806,653 | B2 | 10/2020 | Upchurch et al. | |
| 10,940,068 | B2 * | 3/2021 | Patmore | A61G 7/0509 |
| 2006/0058587 | A1 * | 3/2006 | Heimbrock | A61G 7/0507 600/300 |
| 2008/0235872 | A1 * | 10/2008 | Newkirk | G06F 3/0481 5/658 |
| 2011/0247137 | A1 * | 10/2011 | Herman | A61G 7/018 5/503.1 |
| 2013/0253291 | A1 * | 9/2013 | Dixon | A61B 90/98 600/323 |
| 2015/0342361 | A1 * | 12/2015 | Shih | A47C 27/146 5/694 |
| 2016/0367420 | A1 * | 12/2016 | Zerhusen | A61G 7/018 |
| 2019/0015276 | A1 * | 1/2019 | Bhimavarapu | A61G 7/0524 |
| 2021/0330526 | A1 * | 10/2021 | Kennedy | A61G 7/0524 |
| 2021/0338504 | A1 | 11/2021 | Childs et al. | |
| 2023/0369871 | A1 * | 11/2023 | Meyer | H02J 7/70 |

OTHER PUBLICATIONS

English language abstract and machine-assisted English translation for CN 108186232 A extracted from espacenet.com database on Jun. 27, 2024, 9 pages.

* cited by examiner

PATIENT SUPPORT APPARATUSES WITH PORTABLE ELECTRONIC DEVICE CHARGING

CROSS-REFERENCE TO RELATED APPLICATION

The subject patent application claims priority to and all the benefits of U.S. Provisional Patent Application No. 63/348,662, filed on Jun. 3, 2022, the disclosure of which is hereby incorporated by reference in its entirety.

BACKGROUND

Patient support apparatuses, such as hospital beds, stretchers, cots, tables, wheelchairs, and chairs are used to help caregivers facilitate care of patients in a health care setting. Conventional patient support apparatuses generally comprise a base and a patient support surface upon which the patient is supported. Often, these patient support apparatuses have one or more movable components, such as side rails that can be moved between raised and lowered positions, deck sections which articulate to adjust the patient support surface to support the patient between different patient support configurations, as well as lift mechanisms that adjust the height of the patient support surface.

As wireless charging capabilities for portable electronic devices (e.g., mobile phones, tablets, and the like of various form factors) become increasingly prevalent on patient support apparatuses, patient safety is at risk for patients that have implantable devices that may malfunction due to cross-interference with the wireless charging capabilities. Implantable devices, such as pacemakers or implantable pulse generators, are sensitive to a variety of forms of electromagnetic interference due to their sensing systems that respond to low-level electrical signals. Furthermore, there is also a risk for external devices to malfunction due to cross-interference with the wireless charging capabilities. Ensuring that portable electronic devices as well as other devices associated with the patient support apparatus receive sufficient electrical power when needed while maintaining patient safety and device functionality presents a difficult engineering task of managing a wireless charging system on a patient support apparatus.

Previous patient support apparatus wireless charging systems have left room for improvement in this area. Accordingly, there remains a need in the art to address one or more of the challenges outlined above.

SUMMARY

The present disclosure provides a patient support apparatus including: a support structure including a patient support deck defining a patient support surface; a charging interface coupled to the support structure and being operable between: a first charge state for charging portable electronic devices where the charging interface generates an electromagnetic field, and a second charge state where the charging interface at least partially limits generation of the electromagnetic field; a sensor system coupled to the support structure to generate data representing changes in patient position on the support structure relative to a patient safety zone defined spaced from the charging interface; and a controller disposed in communication with the sensor system and the charging interface and configured to change operation of the charging interface from the first charge state to the second charge state in response to the data generated by the sensor system indicating a sensed patient position outside the patient safety zone to at least partially reduce the electromagnetic field based on the operation changes of the charging interface between the first charge state and the second charge state different from the first charge state.

The present disclosure also provides a patient support apparatus including: a support structure including a patient support deck defining a patient support surface; a charging interface coupled to the support structure and being operable between: a first charge state for charging portable electronic devices where the charging interface generates an electromagnetic field, and a second charge state where the charging interface at least partially limits generation of the electromagnetic field; a third charge state where the charging interface interrupts generation of the electromagnetic field; a sensor system coupled to the support structure to generate data representing changes in patient position on the support structure relative to a patient safety zone defined spaced from the charging interface; and a controller disposed in communication with the sensor system and the charging interface and configured to change operation of the charging interface from the first charge state to the third charge state in response to the data generated by the sensor system indicating a sensed patient position outside the patient safety zone to interrupt the electromagnetic field based on the operation changes of the charging interface between the first charge state and the third charge state different from the first charge state.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
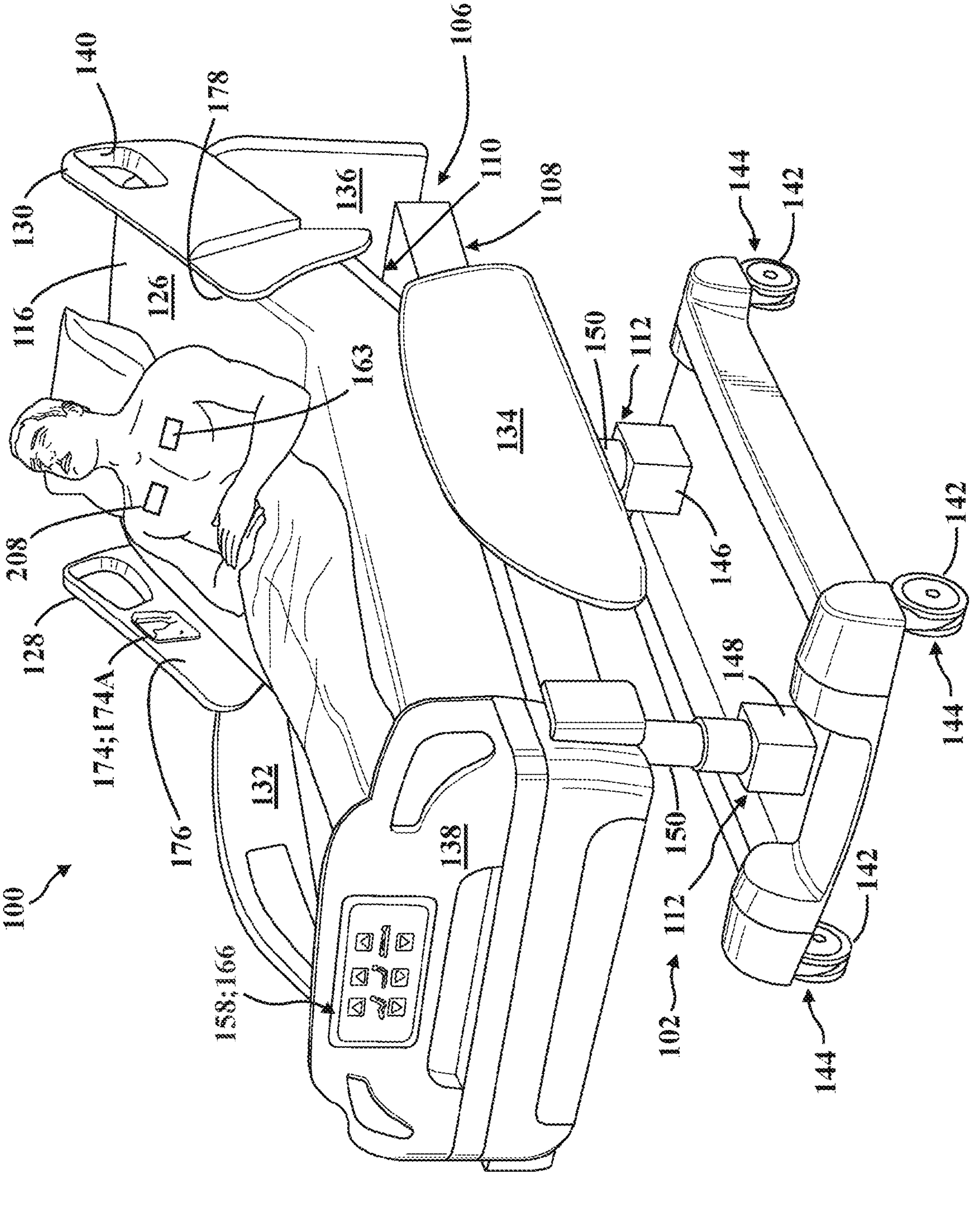
FIG. 1 is perspective view of a patient support apparatus having a base, a litter with a patient support deck, a lift mechanism, side rails, and a caddy.

Referring to FIG. 1, a patient support apparatus 100 is shown for supporting a patient in a heath care setting. The patient support apparatus 100 illustrated throughout the drawings is realized as a hospital bed. In other versions, however, the patient support apparatus 100 may be a stretcher, a cot, a table, a wheelchair, a chair, or a similar apparatus utilized in the care of a patient.

A support structure 102 provides support for the patient. In the representative version illustrated herein, the support structure 102 generally comprises a base 104 and a litter 106. Here, the litter 106 includes an intermediate frame 108 and a patient support deck 110 spaced above the base 104. As is described in greater detail below, a lift mechanism 112 is interposed between the base 104 and the intermediate frame 108 to facilitate moving the litter 106 relative to the base 104 between a plurality of vertical configurations, including without limitation one or more raised configurations 106A (see FIGS. 3A-4A), lowered configurations 106B (see FIG. 4B), and/or inclined configurations 106C (not shown) such as a Trendelenburg configuration (not shown).

The patient support deck 110 has at least one deck section 114 arranged for movement relative to the intermediate frame 108 between a plurality of section positions (not shown in detail). The deck sections 114 of the patient support deck 110 provide a patient support surface 116 upon which the patient is supported. More specifically, in the representative version of the patient support apparatus 100 illustrated herein, the patient support deck 110 has four deck sections 114 which cooperate to define the patient support surface 116: a back section 118, a seat section 120, a leg section 122, and a foot section 124 (see FIGS. 3A-6). In the representative version illustrated herein, the seat section 120 is fixed to the intermediate frame 108 and is not arranged for movement relative thereto. However, it will be appreciated that the seat section 120 could be movable relative to other deck sections 114 in some versions. Conversely, the back section 118 and the leg section 122 are arranged for independent movement relative to each other and to the intermediate frame 108, as described in greater detail below, and the foot section 124 is arranged to move partially concurrently with the leg section 122. Other configurations are contemplated, and it will be appreciated that different arrangements of deck sections 114 are contemplated by the present disclosure. By way of non-limiting example, the patient support deck 110 could be configured without a discrete seat section 120 in some versions. Furthermore, while the representative version of the litter 106 illustrated herein employs the intermediate frame 108 to support the deck sections 114 of the patient support deck 110 for movement relative to the base 104 via the lift mechanism 112, it will be appreciated that various types of litters 106, with or without discrete intermediate frames 108 and/or with a differently-configured lift mechanism 112, are contemplated by the present disclosure.

A mattress 126 is disposed on the patient support deck 110 during use. The mattress 126 comprises or otherwise defines the patient support surface 116 upon which the patient is supported, but it will be appreciated that its shape is defined based on the arrangement of the patient support deck 110. Here too, it will be appreciated that the patient support deck 110 itself would define the patient support surface 116 during operation of some versions of the patient support apparatus 100 without the mattress 126. Put differently, the mattress 126 may be omitted in certain versions, such that the patient can rest directly on the patient support surface 116 defined by the deck sections 114 of the patient support deck 110. The base 104, the litter 106, the intermediate frame 108, and the patient support deck 110 each have a head end and a foot end corresponding to designated placement of the patient's head and feet on the patient support apparatus 100. It will be appreciated that the specific configuration of the support structure 102 may take on any known or conventional design, and is not limited to that specifically illustrated and described herein. Other configurations are contemplated.

Figure 4A:
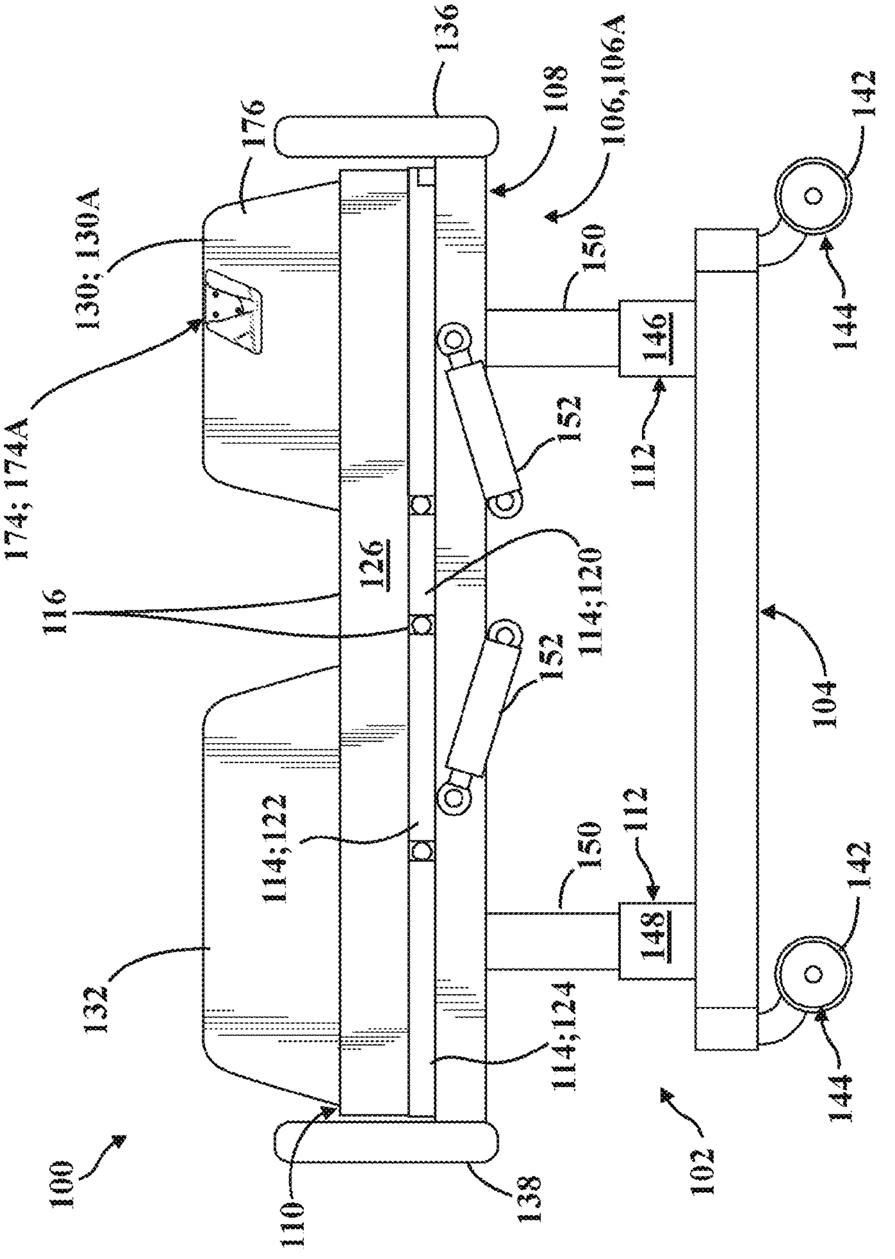
FIG. 4A is another schematic left-side view of the patient support apparatus of FIGS. 3A-3C, shown with two of the side rails removed for illustrative purposes but depicting the caddy coupled to the first side rail, and with the lift mechanism supporting the litter in a raised configuration.
Figure 4B:
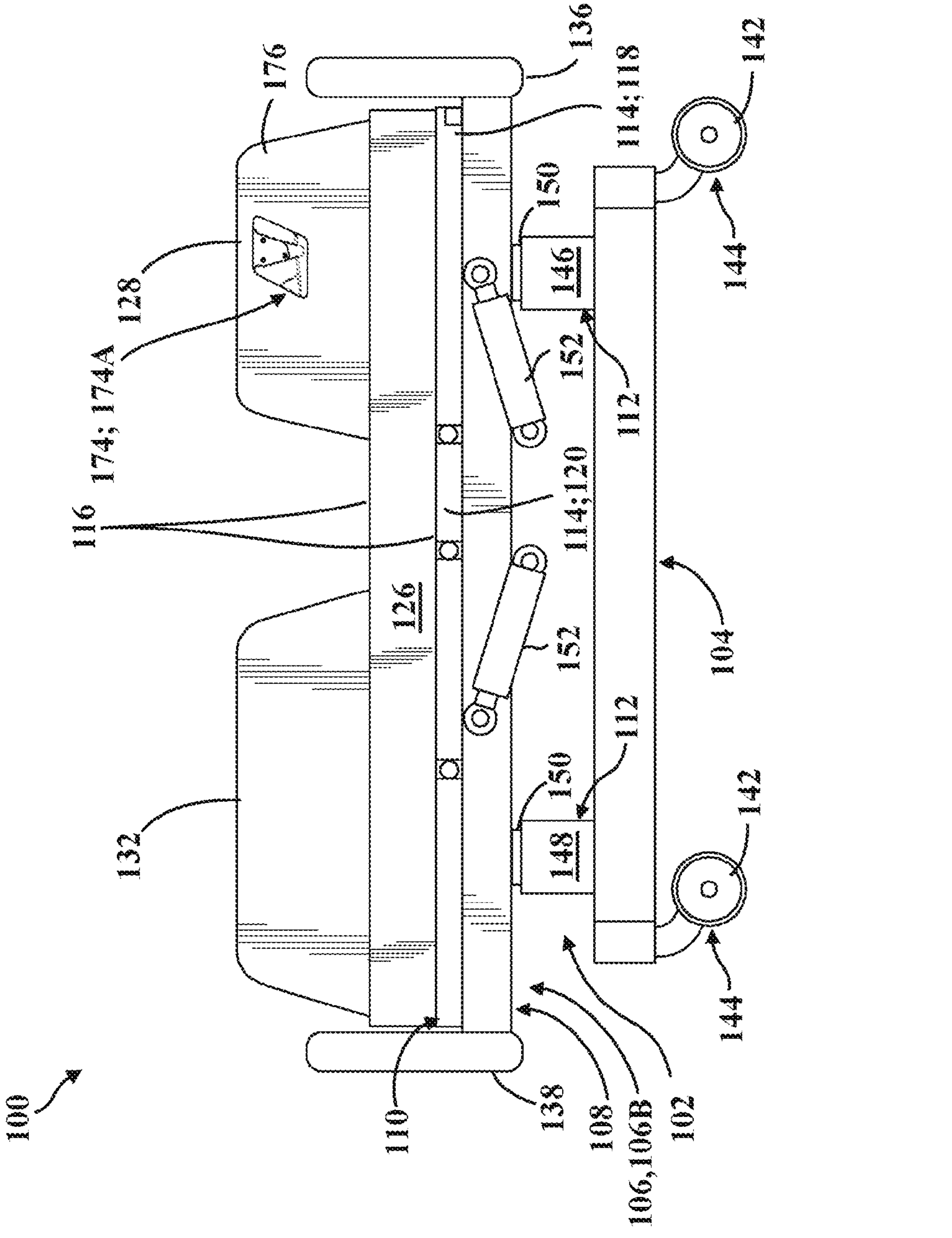
FIG. 4B is another schematic left-side view of the patient support apparatus of FIG. 4A, shown with the lift mechanism supporting the litter in a lowered configuration.
Figure 5:
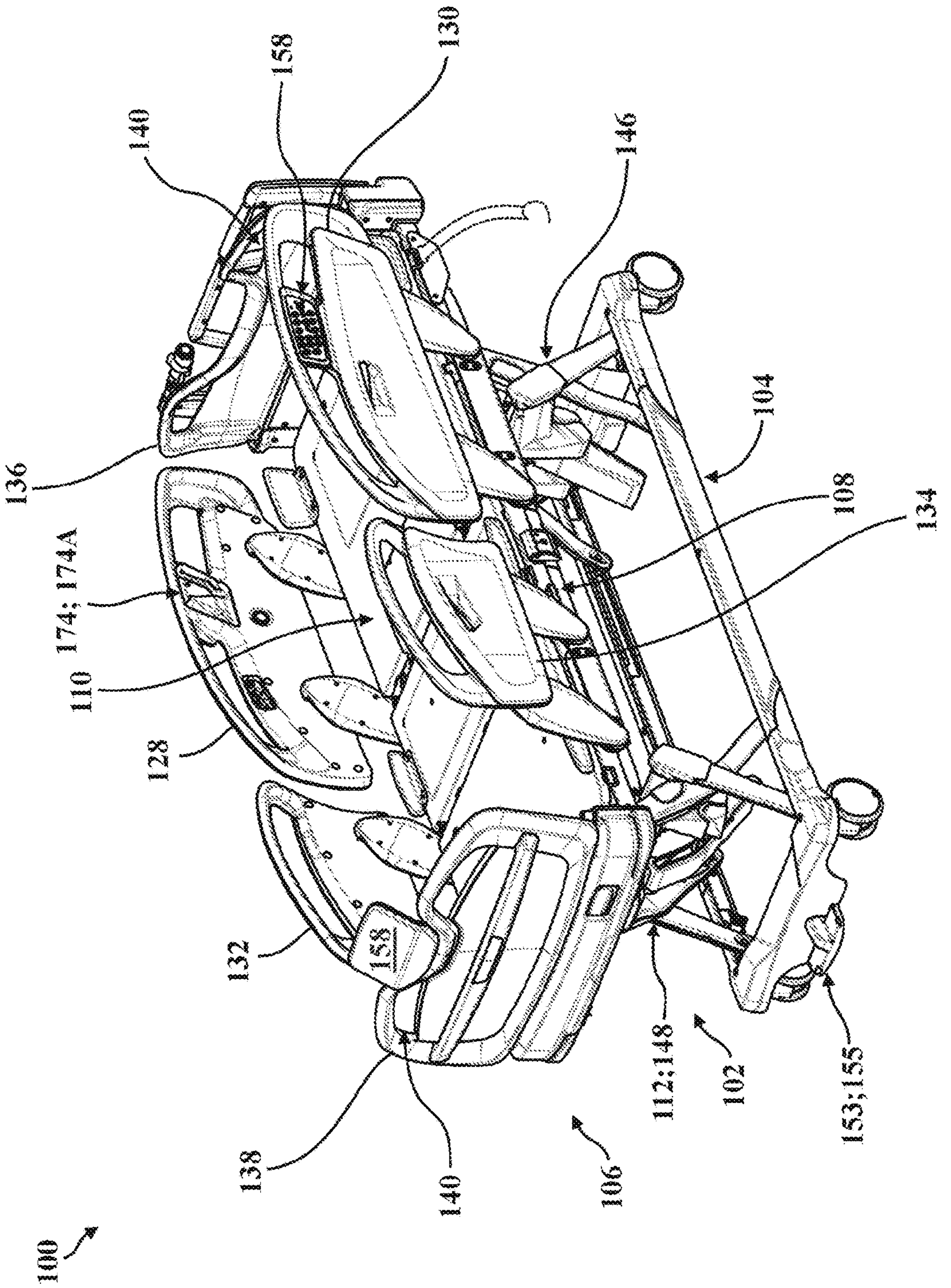
FIG. 5 is a perspective view of another version of the patient support apparatus of FIGS. 1-4B, shown having side rails, a footboard, a headboard coupled to mounts spaced above the base by the lift mechanism, and a sensor system.

Side rails 128, 130, 132, 134 are coupled to the support structure 102 via mounts and are supported for movement relative to the intermediate frame 108 (and, thus, relative to the base 104). A first side rail 128 is positioned at a right head end of the litter 106. A second side rail 130 is positioned at a left head end of litter 106. A third side rail 132 is positioned at a right foot end of the litter 106. A fourth side rail 134 is positioned at a left foot end of the litter 106. As shown in FIG. 5, one or more of the side rails may be coupled to one or mounts via linkages and may be movable between a plurality of side rail positions, including a raised position 128A, 130A in which they block ingress and egress into and out of the patient support apparatus 100 (see FIG. 3A), one or more intermediate positions 128B, 130B (see FIG. 3B), and a lowered position 128C, 130C (see FIG. 3C) in which they are not an obstacle to such ingress and egress across the periphery P of the patient support surface 116. It will be appreciated that there may be fewer side rails for certain versions, such as where the patient support apparatus 100 is realized as a stretcher or a cot. Similarly, it will be appreciated that side rails may be attached to any suitable component or structure of the patient support apparatus 100, and that their respective mount 125 and/or linkage 139 may be configured in various ways. In some versions, the side rails 128, 130, 132, 134 or other portions of the patient support apparatus 100 may be similar to as is described in U.S. Patent Application Publication No. US 2021/0338504 A1, entitled "Side Rail Assembly For A Patient Support Apparatus," the disclosure of which is hereby incorporated by reference in its entirety. Other configurations are contemplated. In the representative version illustrated herein, the first and second side rails 128, 130 are coupled to the back section 118 of the patient support deck 110 and move concurrently therewith. In FIGS. 4A-4B, which each depict left-side views of the patient support apparatus 100, the second and fourth side rails 130, 134 are omitted for illustrative purposes.

As shown in FIGS. 1 and 3A-4B, a headboard 136 and a footboard 138 are coupled to respective mounts of the intermediate frame 108 of the litter 106. However, it will be appreciated that the headboard 136 and/or footboard 138 may be coupled to other locations on the patient support apparatus 100, such as the base 104, or may be omitted in certain versions. One or more caregiver interfaces 140, such as handles, are shown in FIG. 1 as being integrated into the first and second side rails 128, 130 to facilitate movement of the patient support apparatus 100 over floor surfaces. Additional caregiver interfaces 140 may be integrated into the headboard 136, the footboard 138, and/or other components of the patient support apparatus 100, such as the third and/or fourth side rails 132, 134, the intermediate frame 108, and the like. The caregiver interfaces 140 are shaped so as to be grasped by a caregiver as a way to position or otherwise manipulate the patient support apparatus 100 for movement. It will be appreciated that the caregiver interfaces 140 could be integrated with or operatively attached to any suitable portion of the patient support apparatus 100, or may be omitted in certain versions.

Wheels 142 are coupled to the base 104 to facilitate transportation over floor surfaces. The wheels 142 are arranged in each of four quadrants of the base 104, adjacent to corners of the base 104. In the version shown in FIG. 1, the wheels 142 are caster wheels that are able to rotate and swivel relative to the support structure 102 during transport. Here, each of the wheels 142 forms part of a caster assembly 144 mounted to the base 104. In the illustrated version, the patient support apparatus 100 includes a brake assembly 153 operatively attached to one or more of the wheels 142 and being operable between a braked state 153B to inhibit movement of the base 104 about floor surfaces, and an unbraked state 153U to permit movement of the base 104 about floor surfaces. In some versions, the brake assembly 153 includes a brake lever 155 (e.g., a foot pedal) operatively attached to the base 104 and arranged for user engagement to operate the brake assembly 153 between the braked state 153B and the unbraked state 153U. In some versions, the brake assembly 153 may be similar to as is disclosed in U.S. Pat. No. 10,806,653, entitled "Patient Transport Apparatus With Electro-Mechanical Braking System," and/or International Patent Application Publication No. WO 2021/138176 A1, entitled "Patient Transport Apparatus With Electro-Mechanical Braking System," the disclosures of each of which are hereby incorporated by reference in their entirety. Other configurations are contemplated.

It should be understood that various configurations of the caster assemblies 144 are contemplated. In addition, in some versions, the wheels 142 are not caster wheels. Moreover, it will be appreciated that the wheels 142 may be non-steerable, steerable, non-powered, powered, or combinations thereof. While the representative version of the patient support apparatus 100 illustrated herein employs four wheels 142, additional wheels are also contemplated. For example, the patient support apparatus 100 may comprise four non-powered, non-steerable wheels, along with one or more additional powered wheels. In some cases, the patient support apparatus may not include any wheels. In other versions, one or more auxiliary wheels (powered or non-powered), which are movable between stowed positions and deployed positions, may be coupled to the support structure 102. In some cases, when auxiliary wheels are located between caster assemblies 144 and contact the floor surface in the deployed position, they cause two of the caster assemblies 144 to be lifted off the floor surface, thereby shortening a wheel base of the patient support apparatus 100. A fifth wheel may also be arranged substantially in a center of the base 104.

As noted above, the patient support apparatus 100 employs the lift mechanism 112 to lift and lower the litter 106 relative to the base 104 which, in turn, moves the intermediate frame 108 together with the patient support deck 110 between various vertical configurations, such as to the raised vertical configuration 106A depicted in FIGS. 3A-4A, the lowered vertical configuration 106B depicted in FIG. 4B, or to any desired vertical configuration therebetween including various inclined configurations. To this end, the lift mechanism 112 may include a head end lift member 146 and a foot end lift member 148 which are each arranged to facilitate movement of the litter 106 with respect to the base 104 using one or more lift actuators 150. The lift actuators 150 may be realized as linear actuators, rotary actuators, or other types of actuators, and may be electrically operated and/or may be hydraulic. It is contemplated that, in some configurations, only one lift member and one associated lift actuator may be employed, e.g., to raise only one end of the litter 106, or one central lift actuator to raise and lower the litter 106. The construction of the lift mechanism 112, the head end lift member 146, and/or the foot end lift member 148 may take on any known or conventional design, and is not limited to that specifically illustrated. By way of non-limiting example, the lift mechanism 112 could comprise a "scissor" linkage arranged between the base 104 and the litter 106 with one or more actuators configured to facilitate vertical movement of the patient support deck 110. In some versions, the lift mechanism 112 may be similar to as is described in U.S. Pat. No. 10,172,753, entitled "Patient Support Lift Assembly," the disclosure of which is hereby incorporated by reference in its entirety. Other configurations are contemplated.

As noted above, the patient support deck 110 is operatively attached to the intermediate frame 108 (e.g., as depicted in FIGS. 1 and 3A-6), with one or more of the deck sections 114 arranged for movement between a first section position and a second section position. To this end, one or more deck actuators 152 are interposed between the deck section 114 and the intermediate frame 108 to move the deck section 114. In the representative versions illustrated herein, the deck actuator 152 is realized as a linear actuator disposed in force-translating relationship between the deck section 114 and the intermediate frame 108. More specifically, one deck actuator 152 is provided between the intermediate frame 108 and the back section 118, and another deck actuator 152 is provided between the intermediate frame 108 and the leg section 122, and each of the deck actuators 152 is arranged for independent movement to position the respective deck sections 114 to adjust the shape of the patient support surface 116 between a plurality of patient support configurations (for example, a flat configuration, a raised fowler configuration, a seated configuration, etc.). The deck actuator 152 coupled to the back section 118 is configured to move the back section 118 between the first section position, the second section position, as well as to additional section positions between the first and second section positions and/or to section positions beyond the second section position.

Those having ordinary skill in the art will appreciate that the patient support apparatus 100 could employ any suitable number of deck actuators 152, of any suitable type or configuration sufficient to effect selective movement of one or more of the deck sections 114 relative to the litter 106 or other components of the support structure 102. By way of non-limiting example, the deck actuator 152 could be a linear actuator or one or more rotary actuators driven electronically and/or hydraulically, and/or controlled or driven in any suitable way. Moreover, the deck actuator 152 could be mounted, secured, coupled, or otherwise operatively attached to the intermediate frame 108 and to the deck section 114, either directly or indirectly, in any suitable way. In addition, one or more of the deck actuators 152 could be omitted for certain applications.

The patient support apparatus 100 employs a control system, generally indicated at 154, to effect operation of various functions of the patient support apparatus 100, as described in greater detail below. To this end, and as is best shown schematically in FIG. 2, the control system 154 generally includes a controller 156 disposed in communication with one or more user interfaces 158 adapted for use by the patient and/or the caregiver to facilitate operation of one or more functions of the patient support apparatus 100. In certain versions, the controller 156 is also disposed in communication with the lift actuators 150, the deck actuators 152, a sensor system 160, one or more local alarms 162, one or more charging interfaces 164, and/or a communication interface 166 for communicating with a remote device 168. Each of these components will be described in greater detail below.

Figure 2:
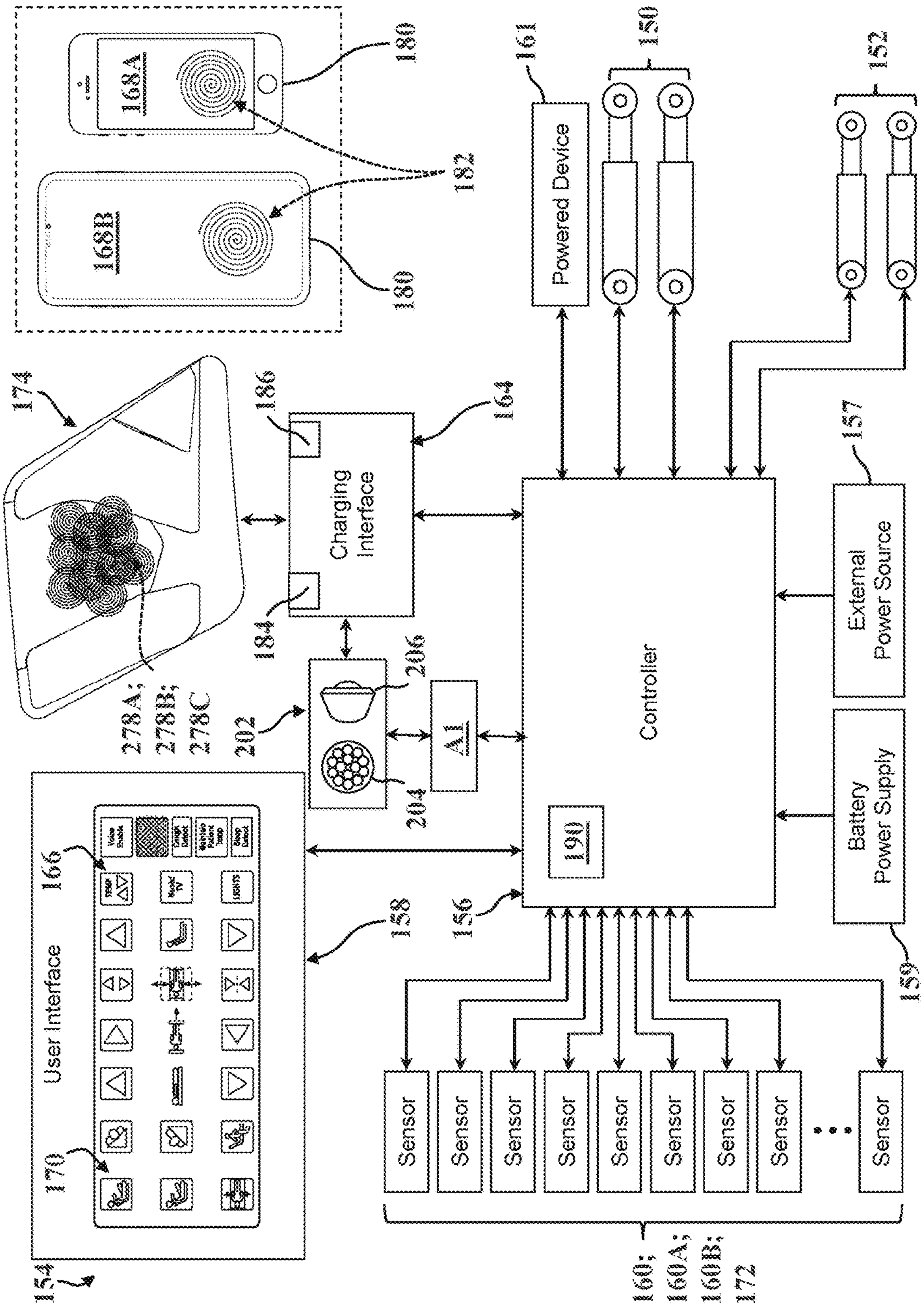
FIG. 2 is an illustrative view of a control system of the patient support apparatus of FIG. 1.
Figure 3A:
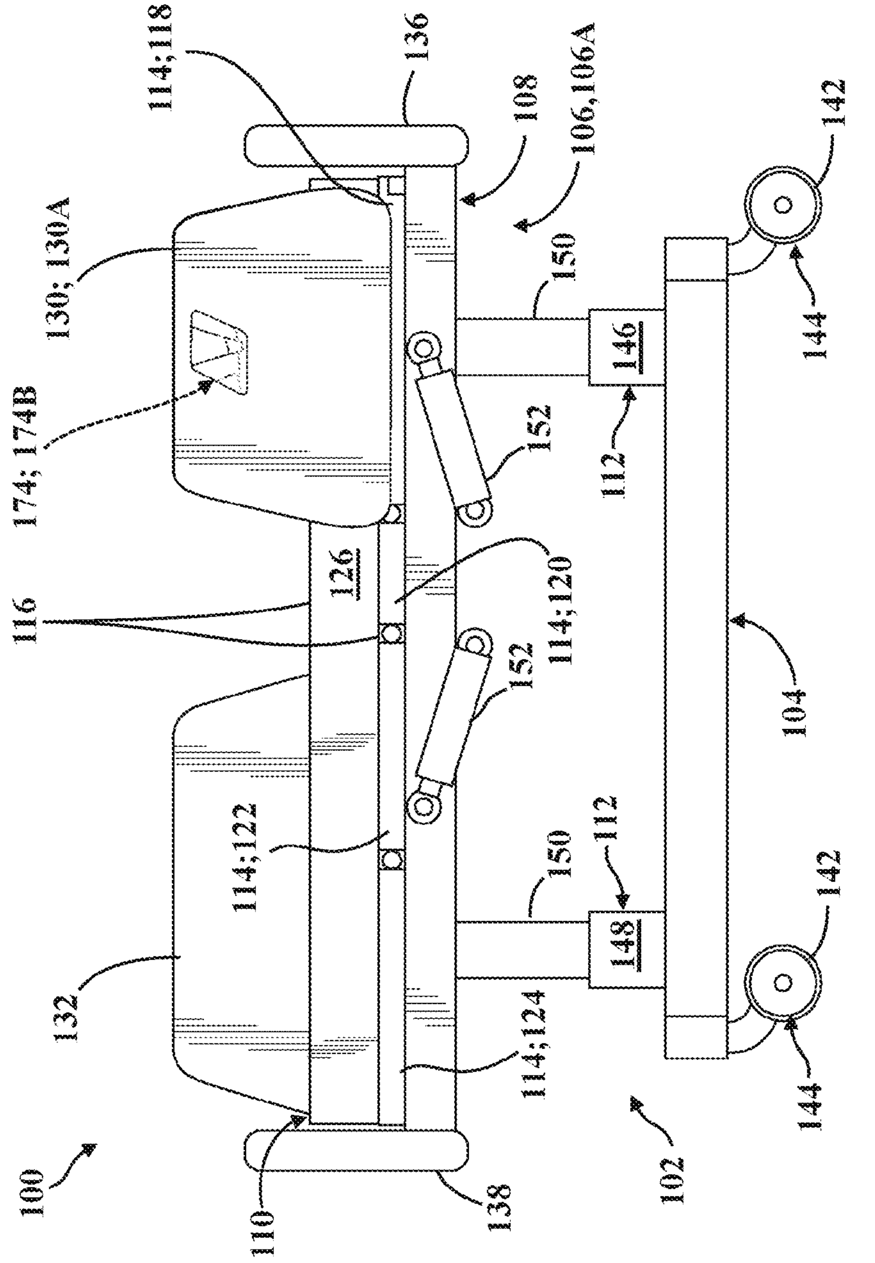
FIG. 3A is a schematic left-side view of the patient support apparatus of FIG. 1, shown with a first side rail and a second side rail arranged in a raised position, and with a second caddy coupled to the second side rail depicted in phantom.
Figure 3B:
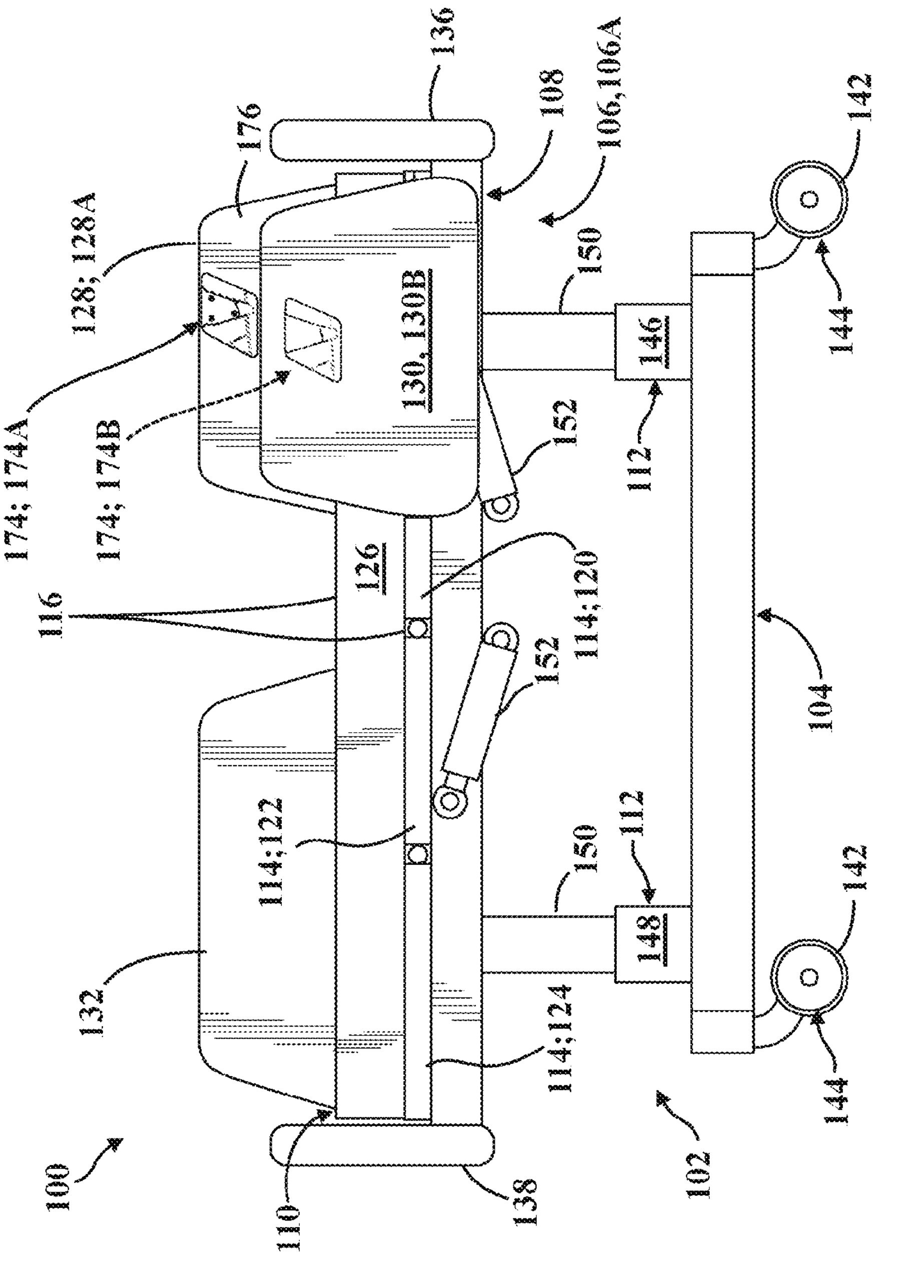
FIG. 3B a schematic left-side view of the patient support apparatus of FIG. 3A, shown with the second side rail arranged in an intermediate position supporting the second caddy depicted in phantom, and shown with the first side rail arranged in the raised position supporting the first caddy.
Figure 3C:
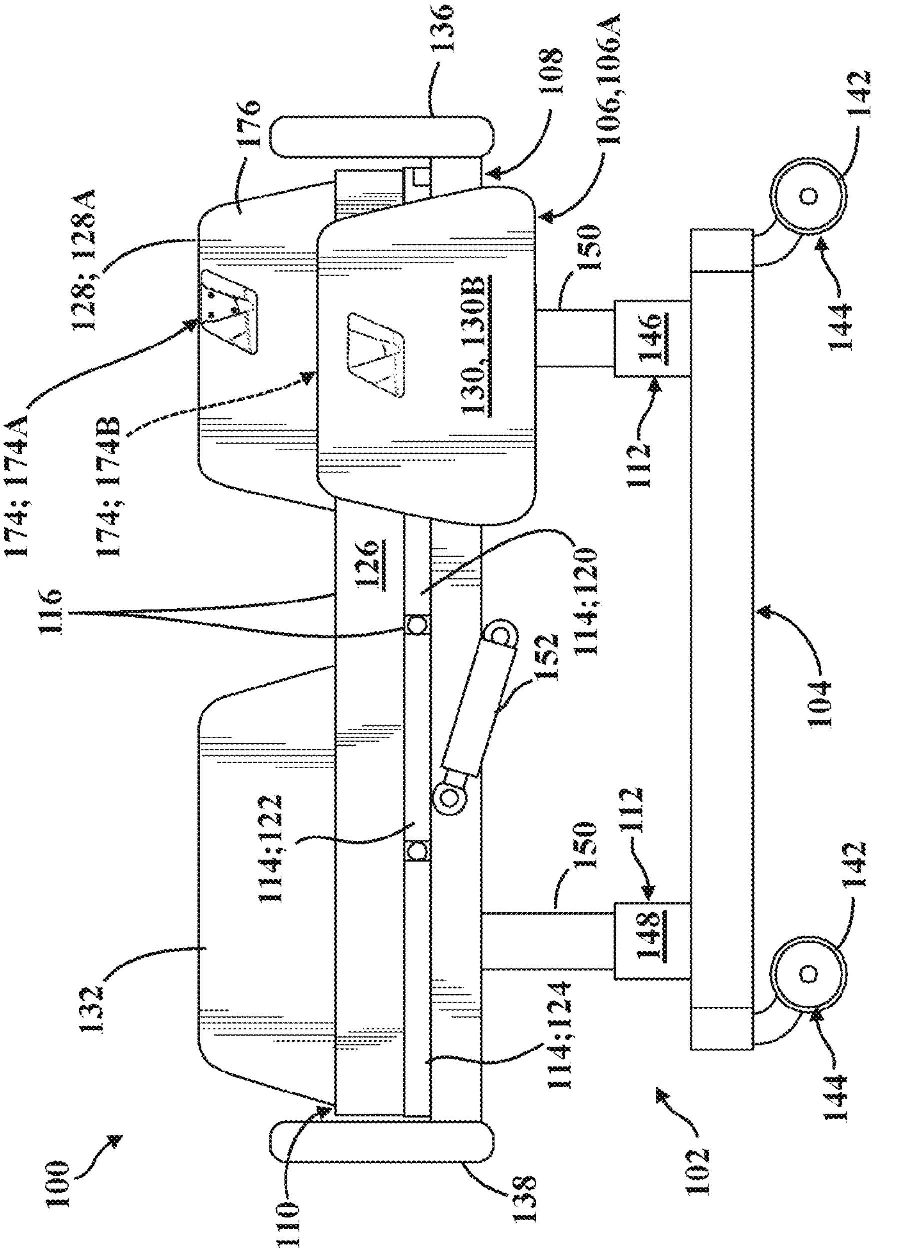
FIG. 3C is another schematic left-side view of the patient support apparatus of FIGS. 3A-3B, shown with the second side rail arranged in a lowered position supporting the second caddy depicted in phantom.

As noted above, the controller 156 is best depicted schematically FIG. 2, and has been omitted from certain drawings for the purposes of clarity and consistency. It will be appreciated that the controller 156 and/or the control system 154 can be configured or otherwise arranged in a number of different ways. The controller 156 may have one or more microprocessors for processing instructions or for processing an algorithm stored in memory to control operation of the actuators 150, 152, generation or interpretation of signals and/or data (e.g., data from sensors, the sensor system 160, and the like), communication with the user interfaces 158 and/or remote devices 168, performance of one or more functions of powered devices 161, and the like. Additionally or alternatively, the controller 156 may comprise one or more microcontrollers, field programmable gate arrays, systems on a chip, discrete circuitry, and/or other suitable hardware, software, or firmware that is capable of carrying out the various functions and operations described herein. The controller 156 may be carried on-board the patient support apparatus 100, such as on the base 104 or the litter 106, or may be remotely located. The controller 156 may comprise one or more subcontrollers configured to control all of the actuators 150, 152 and/or user interfaces 158 or one or more subcontrollers for each actuator 150, 152 and/or user interface 158 (or other component of the patient support apparatus 100). The controller 156 may communicate with the actuators 150, 152, the user interfaces 158, and or other components of the control system 154 via wired or wireless connections. Power to the actuators 150, 152, other powered devices, and/or the controller 156 may be provided by an external power source 157 and/or a battery back-up power supply 159. The external power source 157 and/or the battery back-up power supply 159 may provide power to one or more powered devices 161, actuators 150, 152, user interfaces 158, and/or charging interfaces 164. The battery back-up power supply 159 may include one or more chargers. For instance, a bed charger may be provided in electrical communication with the battery back-up power supply 159. The bed charger may have a tether for attaching to a main power source and/or the external power source 157 to charge the battery back-up power supply 159.

In the representative version illustrated in FIGS. 1 and 2, the patient support apparatus 100 comprises a plurality of user interfaces 158 which may be accessible by the patient, the caregiver, or by both the caregiver and the patient. Each user interface 158 of the patient support apparatus 100 generally comprises an input device 170 configured to generate an input signal in response to activation by a user which, in turn, is communicated to the controller 156. The controller 156, in turn, is responsive to the input signal and can control or otherwise carry out one or more functions of the patient support apparatus 100 in response to receiving the input signal. Put differently, the controller 156 is configured to perform a function of the patient support apparatus 100 in response to receiving the input from the input device 170. By way of non-limiting example, the input device 170 could be realized as a "lift bed" button, activation of which causes the controller 156 to drive the lift actuators 150 to move the intermediate frame 108 of the litter 106 from the maximum lowered configuration 106B (see FIG. 4B) vertically away from the base 104 towards the raised configuration 106A (see FIG. 4A). In some versions, one or more of the user interfaces 158 may also employ an output device 172, such as a screen, one or more audible and/or visual indicators (e.g., speakers, beepers, light emitting diodes LEDs, and the like), to communicate information to the user (e.g., to the caregiver). In some versions, the user interface 158 may be realized as a touchscreen interface that serves as both an input device 170 and an output device 172.

In some versions, the controller 156 may be configured to facilitate navigation of visual content of the user interface 158 (e.g., realized as a graphical user interface GUI) in response to receiving the input signal from the input device 170. Thus, it will be appreciated that the user interface 158 could be configured in a number of different ways sufficient to generate the input signal. Moreover, it will be appreciated that the user interfaces 158 could be of a number of different styles, shapes, configurations, and the like. By way of non-limiting example, one or more of the user interfaces 158 may comprise buttons, indicators, screens, graphical user interfaces, and the like. Other configurations are contemplated.

As shown throughout the drawings, in the representative configurations illustrated herein, one or more of the side rails 128, 130, 132, 134 includes a caddy 174 which is configured to removably retain differently-sized portable electronic devices 168A, 168B. As is described in greater detail below, the caddy 174 may be electrically coupled with one or more charging interfaces 164 for facilitating charging of different types of portable electronic devices 168A, 168B. Those having ordinary skill in the art will appreciate that patient use of portable electronic devices 168A, 168B is commonplace. By way of non-limiting example, a patient may rely on their mobile phone for entertainment, communication, and other purposes while on bed rest following a surgical procedure. As will be appreciated from the subsequent description below, the caddy 174 is shaped and arranged to retain different portable electronic devices 168A, 168B in a number of different orientations irrespective of the specific configuration of the portable electronic device 168A, 168B being retained. To demonstrate this, the representative first and second portable electronic devices 168A, 168B illustrated throughout the drawings are of different sizes; the first portable electronic device 168A is smaller than second portable electronic device 168B, both in terms of width and height (see FIG. 2). It will be appreciated that the portable electronic devices 168A, 168B illustrated throughout the drawings are representative, non-limiting examples of two differently-sized mobile phones, and form no part of the patient support apparatus 100 or the caddy 174. Put differently, a number of differently-sized portable electronic devices can be retained by the caddy 174.

As noted above, the caddy 174 is configured for removably retaining differently-sized portable electronic devices 168A, 168B in a number of different orientations defined, for example, based on movement of the side rails 128, 130, 132, 134. Here, the caddy 174 maintains retention of differently-sized portable electronic devices 168A, 168B during concurrent movement of the side rail 128, 130, 132, 134 and the caddy 174. It will be appreciated that the side rails 128, 130, 132, 134 can move relative to the base 104 in a number of different ways. Furthermore, because the caddy 174 is coupled to one or more of the side rails 128, 130, 132, 134 for concurrent movement, both the caddy 174 and the retained portable electronic device 168A, 168B can likewise be moved relative to the base 104 in a number of different ways. For example, the side rails 128, 130, 132, 134 can be moved relative to the litter 106 between a plurality of side rail positions 128A, 128B, 128C (see FIGS. 3A-3C), and the caddy 174 maintains retention of differently-sized portable electronic devices 168A, 168B as the side rail 128 moves between the plurality of different side rail positions 128A, 128B, 128C. In addition, the side rails 128, 130, 132, 134 can be moved relative to the base 104 based on movement of the litter 106 between a plurality of vertical configurations via operation of the lift mechanism 112, and the caddy 174 maintains retention of differently-sized portable electronic devices 168A, 168B as the litter 106 moves between the plurality of different vertical configuration. Furthermore, in configurations of the patient support apparatus 100 where one or more of the side rails 128, 130 are coupled to the back section 118 for concurrent movement, adjustment of the patient support deck 110 can also move the side rails 128, 132 as the back section 118 is moved between the first and second section positions, and the caddy 174 maintains retention of differently-sized portable electronic devices 168A, 168B as the back section 118 moves between the plurality of section positions.

As best shown in FIG. 1, in some configurations, the first side rail 128 defines a first side rail surface 176, and the second side rail 130 defines a second side rail surface 178 facing toward the first side rail surface 176. A first caddy 174A may be coupled to the first side rail surface 176 (see FIGS. 1, 3B-5) and second caddy 174B may be coupled to the second side rail surface 178 (see FIG. 3A in phantom). With this configuration, a separate caddy 174 may be coupled to each of the first and second side rails 128, 130, thereby allowing the patient to store their portable electronic device 168A, 168B on either the left or right side of the patient support apparatus 100, and/or to store one portable electronic device on the left side of the patient support apparatus 100 and another portable electronic device on the right side of the patient support apparatus 100 (not shown in detail). However, other configurations are contemplated, and one or more of the caddies 174 may each also be configured to retain multiple portable electronic devices simultaneously in some configurations (not shown). Furthermore, while caddies 174 are shown as being coupled to the head-end side rails 128, 130 in the illustrated configurations, it will be appreciated that the specific configuration of the side rails 128, 130, 132, 134 could be different than the representative examples provided herein. Thus, in some configurations, caddies 174 may additionally or alternatively be coupled to foot-end side rails 132, 134 and/or to other components of the patient support apparatus 100 (e.g., the headboard 136, the footboard 138, and the like). Other configurations are contemplated.

Referring back to FIG. 2, as noted above, the control system 154 of the patient support apparatus 100 may employ one or more charging interfaces 164 in some configurations for electrically coupling with, and facilitating charging of, different types of portable electronic devices 168A, 168B, powered devices 161, and any other type of electronic devices. Portable electronic devices 168A, 168B typically include one or more ports 180 (e.g., a "charging port") employed to facilitate connection to tethers (e.g., universal serial bus cables, lightning cables, and the like). Furthermore, conventional portable electronic devices 168A, 168B may also include one or more device coils 182 used to facilitate wireless charging. Any form of wireless charging that may be utilized, examples of which are described herein and include, but are not limited to, capacitive charging, inductive charging, and other wireless charging methods.

In the representative configurations illustrated herein, and as is depicted schematically in FIG. 2, the charging interface 164 may comprise a wired interface 184 and/or a wireless charging interface 186. The wired interface 184 is operatively attached to the caddy 174 for electrically coupling with tethers provided to connect to ports 180 of different portable electronic devices 168A, 168B. Tether connector(s) may define the wired interface 184 of the charging interface 164 and comprise a connector port to which a suitable tether can be attached. For example, the connector port may be a Universal Serial Bus (USB) port to which a USB cable attaches. In another example, the connector port may be a lightning port to which a lightning cable attaches. The tether connector(s) may be connected to the controller 156 either directly or indirectly in order to provide power from the power supplies 157, 159 to charge portable electronic devices 168A, 168B. Those having ordinary skill in the art will appreciate that power regulation to the wired interface 184 can be achieved in a number of different ways and/or according to a number of different charging protocols. By way of non-limiting example, the controller 156 could be configured to provide specific voltages and/or currents to the wired interface 184, which could be based on various industry standards or could be adjusted for certain types of portable electronic devices 168A, 168B. In some configurations, a separate charging controller (not shown) may be disposed in communication with the controller 156 to facilitate regulating power to the charging interfaces 164 and/or to the portable electronic devices 168A, 168B. Other configurations are contemplated.

In the representative configuration illustrated herein, the wireless charging interface 186 comprises a plurality of wireless charging coils 186A, 186B, 186C operatively attached to the caddy 174 for electrically coupling with device coils 182 of different portable electronic devices 168A, 168B. The plurality of wireless charging coils 186A, 186B, 186C may be configured to be transmit coils operatively coupled to the device coils 182 to transmit power to the portable electronic devices 168A, 168B or any other electronic device including the device coils 182. In this case, the device coils 182 may be receiver coils. Here, schematically-depicted first, second, and third wireless charging coils 186A, 186B, 186C are shown in FIG. 2 to illustrate one exemplary configuration of the wireless charging interface 186. The first, second, and third wireless charging coils 186A, 186B, 186C are shown spaced about the caddy 174 in different locations to facilitate communicating with device coils 182 of portable electronic devices 168A, 168B irrespective of how the portable electronic devices 168A, 168B themselves are retained by the caddy 174 (e.g., to ensure charging from multiple positions) and/or irrespective of the configuration of the device coil 182 (e.g., to ensure charging of different styles of portable electronic devices). Here, the wireless charging interface 186 may be connected to the controller 156 either directly or indirectly in order to provide power from the power supplies 157, 159 to charge portable electronic devices 168A, 168B. Those having ordinary skill in the art will appreciate that power regulation to the wireless charging interface 186 can be achieved in a number of different ways and/or according to a number of different charging protocols. In some configurations, a separate charging controller (not shown) may be disposed in communication with the controller 156 to facilitate regulating power to the charging interfaces 164 and/or to the portable electronic devices 168A, 168B.

In some configurations, only a single wireless charging coil may be used (e.g., the first wireless charging coil 186A). However, it will be appreciated that any suitable number of wireless charging coils could be utilized (e.g., one, two, three, more than three, and the like). Furthermore, while certain representative configurations of the wireless charging interface 186 are depicted in certain drawing views with a total of three similarly-sized wireless charging coils each having a generally circular profile, it will be appreciated that other configurations are contemplated, and certain wireless charging coils could be sized larger or smaller than others and/or could have other profiles (e.g., non-circular). In some configurations, wireless charging coils could be "stacked" on top of each other in multiple planes (see FIG. 2; not shown in detail) to eliminate potential "gaps" between adjacent coils arranged within a common plane. In some configurations, the "stacked" arrangement of wireless charging coils could be achieved with a predetermined amount of overlap (e.g., 50% overlap). In some configurations, one or more wireless charging coils could be provided with "contoured" geometry, such as to conform to different types of surface profiles of the caddy 174 and/or the side rail 130. Other configurations are contemplated. The wireless charging coils 186A, 186B, 186C described here can be manufactured with wires, Litz wire, printed circuit board (PCB), stamped, formed, shaped, metal or magnetic material. The spiral patterns shown herein are for exemplary purposes and the coils may be any shape, size, or pattern that could generate a magnetic field. In some configurations, the coils may be permanent magnets or electromagnets activated by application of an electrical current. Furthermore, while the wireless charging interface 186 are shown as utilizing coils in the illustrated configurations, it will be appreciated that the wireless charging interface 186 may utilize any type of conductor for the purposes of wireless charging.

The plurality of wireless charging coils 186A, 186B, 186C may be configured to be transmit coils configured to interact with the device coils 182. As mentioned above, the device coils 182 may be configured to be a receiver coil 182, which can operatively couple to the transmit coils 186A, 186B, 186C to transmit power via electromagnetic induction or magnetic resonance. The receiver coils 182 interact with the transmit coils 186A, 186B, 186C, for example, via a region of a magnetic and/or an electromagnetic field F generated by the transmit coils 186A, 186B, 186C. The transmit coils may be electromagnetic coils that produces a time-varying electromagnetic flux to induce a current within an electromagnetic coil within the portable electronic devices 168A, 168B or any other electronic device. The receiver coils may interact with the transmit coils, for example, via a region of a magnetic and/or an electromagnetic field generated by the transmit coils. The transmit coils may produce a static electromagnetic field and can physically move, shift, or otherwise change its position to produce a spatially-varying electromagnetic flux to induce a current within the receive coil. While the electromagnetic fields F are shown to be static throughout the Figures, it will be appreciated that the electromagnetic fields may be dynamic. While the device coils 182 are shown as coils in the illustrated configurations, it will be appreciated that the device coils 182 may utilize any type of conductor for the purposes of wireless charging. The charging interface 186 will be discussed in greater detail below.

Referring now, generally, to FIGS. 2 and 6-11B, as noted above, the patient support apparatus 100 described and illustrated herein provides for wireless charging of remote devices, including portable electronic devices 168A, 168B, and/or powered devices 161. With electronic devices being so prevalent in society, patients tend bring their device everywhere with them including to the hospital while utilizing a patient support apparatus 100. In cases where patients have implantable devices 208, there may be a risk of cross-interference of electromagnetic fields between the wireless charging provided by the patient support apparatus 100 and the patient's implantable device 208. For instance, the patient may have a pacemaker 208 that is susceptible to electrical interference such that the desired functionality of the pacemaker 208 is impaired. Such interference can damage the circuitry of the pacemaker 208 or cause a disruption in the proper operation or functionality of the pacemaker 208. Other implantable devices 208 are contemplated, such as, but not limited to, cardioverter defibrillators (ICDs). Not only are implantable devices 208 relevant, but also remote devices 168 that are sensitive to electromagnetic interference. To ensure patient safety and prevent cross-interference, the patient support apparatus 100 of the present disclosure employs the sensor system 160 to, among other things, generate data D representing changes in patient position on the support structure 102, which is evaluated by the controller 156 relative to a patient safety zone 188 defined spaced from the charging interface 164, as described in greater detail below. Further, the charging interface 164 is operable between a first charge state 164' and a second charge state 164". The controller 156 is configured to change operation of the charging interface 164 in response to the data D generated by the sensor system 160. More specifically, when the sensor system 160 indicates that the sensed patient position is outside the patient safety zone 188. In this way, the electromagnetic field of the charging interface 164 is at least partially reduced to prevent any cross-interference between the charging interface 164 and the patient, including any implantable device 208, and/or remote devices 168. Operation of the charging interface 164 will be discussed in greater detail below.

As noted above, the sensor system 160 is employed to generate data D representing changes in patient position on the patient support structure 102. In some versions, the sensor system 160 includes a plurality of load cells 160A interposed in force-translating relation between the intermediate frame 108 and the base 104 to measure load acting on the support structure 102. Here, each load cell 160A generates a respective output signal representing the amount of weight sensed thereby. More specifically, a total of four load cells 160A may be interposed between the intermediate frame 108 and the lift members 146, 148 of the lift mechanism 112 to measure load (e.g., patient weight) acting about the patient support surface 116 as well as on other portions of the intermediate frame 108 or components coupled thereto.

While the sensor system 160 employs load cells 160A to generate data D representing changes in patient position on the patient support structure 102, it will be appreciated that the sensor system 160 may be configured in other ways. By way of non-limiting example, the sensor system 160 may additionally or alternatively employ other types of sensors to detect the patient movement relative to the support structure 102, including such as by bed sensors, and/or by other types of sensors such as optical sensors (e.g., a camera) configured to detect patient movement relative to the patient support apparatus 100. In some configurations, the sensor system 160 includes a proximity sensor in communication with the controller 156 to monitor patient position relative to the patient support surface 116. In other configurations, the sensor system 160 includes a detector 160B configured for tracking an emitter 163 attachable to the patient (shown generally in FIG. 1), or to other external devices or medical equipment, whereby the detector 160B is configured to sense positional changes of the emitter 163. To this end, the emitter 163 is configured to generate a signal that is detectable by the detector 160B to detect positional changes of the emitter 163 (e.g., via near field communication NFC, radio frequency identification RFID, and the like). Other configurations are contemplated. It will be appreciated that the controller 156 may be configured for tracking any emitter relative to the patient support apparatus 100. For instance, the controller 156 may be configured for tracking an emitter, such as a pacemaker, in a patient. Other configurations are contemplated.

While operation of the load cells 160A of the sensor system 160 is illustrated with respect to a center of gravity indicia CG in some versions, it will be appreciated that the controller 156 may be configured to interpret the data D generated by the sensor system 160 in a number of different ways, including without necessarily monitoring, calculating, or otherwise evaluating a center of gravity. In some versions, the sensor system 160 could evaluate changes in load such as by utilizing look-up tables, predetermined threshold values and/or ranges of predetermined output values for individual load cells (and/or groups of load cells), and the like. In some versions, the controller 156 may evaluate load cells 160A for force in specific directions, either "statically" (e.g., at predetermined intervals) or dynamically. In some versions, the sensor system 160 could evaluate changes in net weight (non-horizontal force). Other configurations are contemplated. It will be appreciated that, although the patient position is represented by the center of gravity indicia CG, the patient position may be represented in various ways. For instance, patient position may be at least partially determined based on the patient's profile, characteristics (e.g., weight, height, size), and the like. In some versions, a position sensor can output motion data indicative of an orientation or rotation of the patient while the patient is supported on the patient support surface 116 to determine patient position. The position sensor may be in communication with the controller 156 and/or a camera such that the controller 156 is configured to render, segment, and/or process data from the position sensor and/or the camera to determine the patient position and display the patient position via a display. In this case, the patient position may be represented as an outline or image of the patient on a display. It will be appreciated that patient position may be detected using any type of sensors, including, but not limited to capacitive sensors, time of flight (ToF) sensors, passive infra-red sensors, or any other type of presence or distance gauging equipment or combinations thereof to detect patient position.

Figure 6:
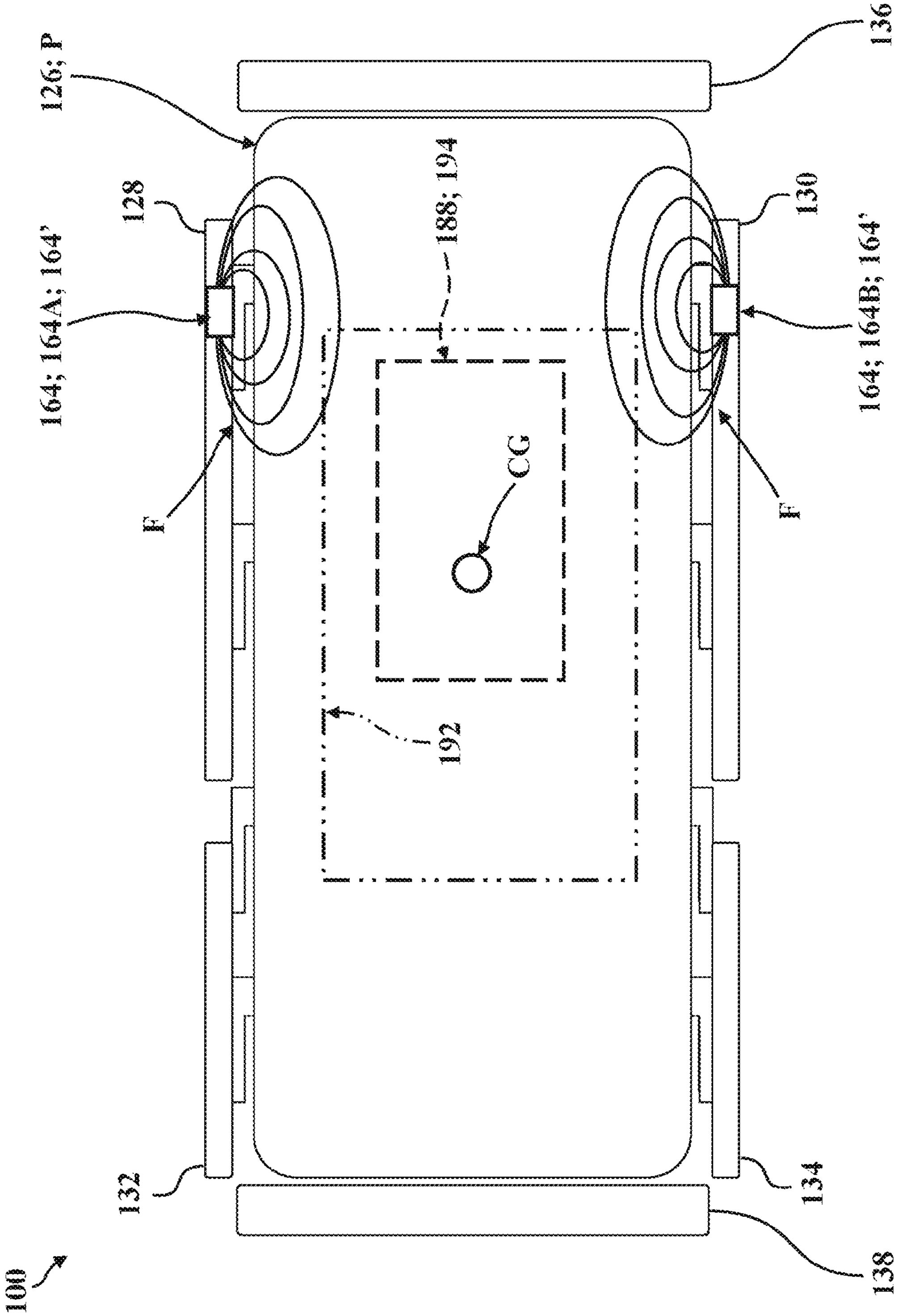
FIG. 6 is a top-side schematic view of the patient support apparatus of FIGS. 1-5B, shown depicting exemplary bed exit and patient safety zones defined relative to a patient support surface, with an illustrative center of gravity indicia determined by the sensor system shown centered on the patient support surface and with charging interfaces generating an electromagnetic field.
Figure 7:
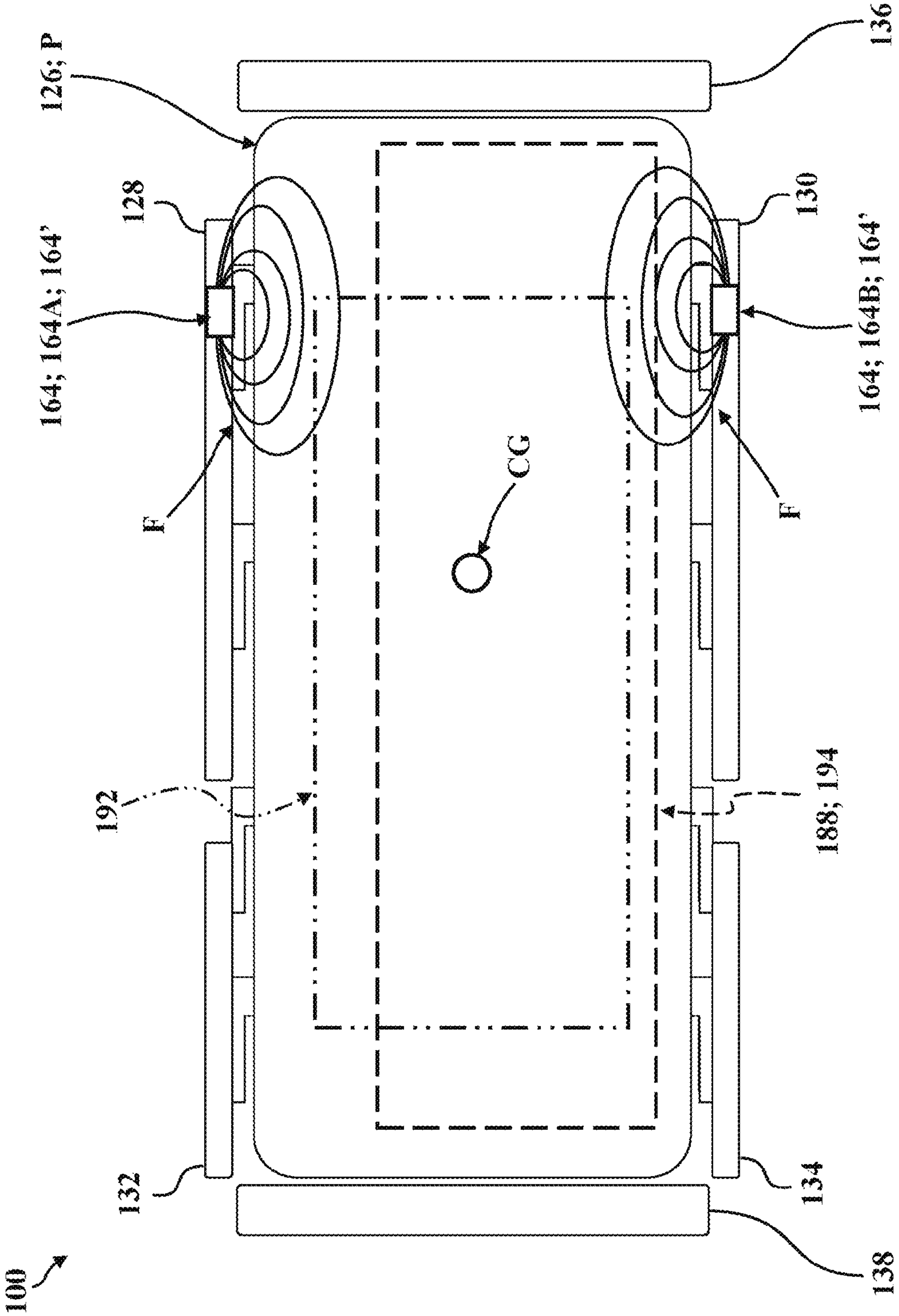
FIG. 7 is another top-side schematic view of the patient support apparatus of FIG. 6, shown with another differently configured bed exit and patient safety zones.

In some versions, the patient support apparatus 100 includes a bed exit monitoring system 190 in communication with the controller 156 and configured to determine one or more of: patient movement about the patient support surface 116 corresponding to a pre-exit condition, and patient movement off of the patient support surface 116. A bed exit zone 192 (shown in FIGS. 6 and 7) may be defined relative to the patient support surface 116 for the bed exit monitoring system 190 to monitor changes in patient load during operation. FIGS. 6 and 7 depict the center of gravity indicia CG arranged within the bed exit zone 192 to illustrate a scenario where the patient is supported on the patient support surface 116 as determined via the load cells 160A. Where a patient shifts about the patient support surface 116 into a position consistent with a pre-exit condition as determined by the bed exit monitoring system 190 via the load cells 160A, the center of gravity indicia CG may be shifted outside the bed exit zone 192 (not shown). In other words, the bed exit monitoring system 190 may be employed to monitor changes in patient load relative to the patient support surface 116 and determine pre-exit conditions as well as exit conditions.

In some versions, the controller 156 is configured to define the patient safety zone 188 relative to the charging interface 164 and/or the patient support surface 116. In this way, patient safety is ensured while allowing the charging interface 164 to properly transmit power to the portable electronic devices 168A, 168B, powered devices 161, and/or any other remote devices. Although the remote device 168 is illustrated as portable electronic devices 168A, 168B, it will be appreciated that the remote device 168 may be any medical device. In one configuration, the patient safety zone 188 may be based at least partially on an amount of weight applied to the patient support surface 116 as determined with the plurality of load cells 160A. While in other configurations, the patient safety zone 188 may be based on other characteristics of the patient (e.g., size, weight, height, and the like) or patient medical history, which may be determined via the sensor system 160, and/or could be received by the controller 156 via the user interface 158 (e.g., entered by the caregiver) or over a network. In any event, the patient safety zone 188 may be at least partially adjustable, such as via the user interface 158, to facilitate proper operation of the charging interface 164 relative to the patient position. Operation of the charging interface 164 will be discussed in greater detail below.

Referring to FIGS. 6 and 7, in some versions, the patient safety zone 188 may include a peripheral edge 194 defined spaced from a periphery P of the patient support surface 116 (e.g., defined by the mattress 126 and/or the patient support deck 110). In some versions, the controller 156 is configured to determine a patient safety distance 196 from the periphery edge 194 of the patient safety zone 188 (best shown in FIG. 6B). The patient safety distance 196 may be predetermined and/or determined either statically or dynamically based on the patient. The patient safety distance 196 may be a predetermined threshold value and/or ranges of predetermined values. The patient safety distance 196 may be utilized to ensure the patient is spaced away from the charging interface 164 at a safe distance and/or within a safe distance from the charging interface 164. For instance, when the patient safety distance 196 is decreased (the distance between the sensed patient position and the peripheral edge 194 of the patient safety zone 188 is decreased), the charging interface 164 reduces generation of the electromagnetic field, whereas when the patient safety distance 196 is increased, the charging interface 164 increases generation of the electromagnetic field.

The patient safety zone 188 may include any number of zones. For instance, in some versions, the patient safety zone 188 may include two zones with a first patient safety zone 188A being defined relative to the patient support surface 116 (see FIGS. 6-9) and a second patient safety zone 188B being defined relative to the charging interface 164 (see FIGS. 10A-11B). In this case, the controller 156 may further be configured to determine that a first patient safety distance 196A (e.g., the patient safety distance 196) is associated with the first patient safety zone 188A and a second patient safety distance 196B is associated with the second patient safety zone 188B. The second patient safety distance 196B is the distance between the patient position sensed by the sensor system 160 and a peripheral edge 200 of the second patient safety zone 188B. Here, the second patient safety distance 196B (shown in FIG. 10A) is measured outwardly from the peripheral edge 200 of the second patient safety zone 196B such that when the patient safety distance 196 is decreased (the sensed patient position gets closer to the charging interface 164), the charging interface 164 reduces generation of the electromagnetic field, whereas when the patient safety distance 196A is increased (the sensed patient position goes further away from the charging interface 164), the charging interface 164 increases generation of the electromagnetic field.

In some versions, patient safety zone 188, 188A, 188B, and/or the patient safety distance 196 may be adjustable, such as via the user interface 158, to facilitate detecting patient position in different ways based, for example, on caregiver preference, patient behavior or characteristics, and the like. While the bed exit zone 192 and the patient safety zone 188 are illustrated as having a generally rectangular profile that may be scaled (e.g., compare FIG. 6 to FIG. 7) or otherwise adjusted, it will be appreciated that the bed exit zone 192, patient safety zone 188, and any other zones related to the patient support apparatus 100 may have or otherwise define various shapes, which may overlap, and/or which may be adjustable in various ways.

Referring to FIGS. 1 and 8A-8C, the controller 156 depicted in FIG. 2 (or a separate charging controller as noted above) can be configured to operate the charging interface 164 in a number of different ways to facilitate optimizing power transfer to remote devices 168, including the portable electronic devices 168A, 168B, and powered devices 161 while maintaining patient safety. The charging interface 164 is operable between a first charge state 164' wherein the charging interface 164 generates the electromagnetic field F (see FIG. 8A) and a second charge state 164'' wherein the charging interface 164 at least partially limits generation of the electromagnetic field F (see FIG. 8B). In some versions, the charging interface 164 operates in a third charge state 164''' wherein the charging interface 164 interrupts generation of the electromagnetic field F (see FIG. 8C). In this way, operation of the charging interface 164 may be changed, via the controller 156, based at least partially on patient position, patient movement, and the like. It will be appreciated that, although the first charge state 164', second charge state 164'', and third charge state 164''' are described herein as being the "first," "second," and "third" charge states, the particular order of charge states may be varied, and the terms in the phrases "first charge state," "second charge state," and "third charge state" are merely used to distinguish the charge state from other charge states, not to indicate any particular significance to its sequential order.

Figure 8A:
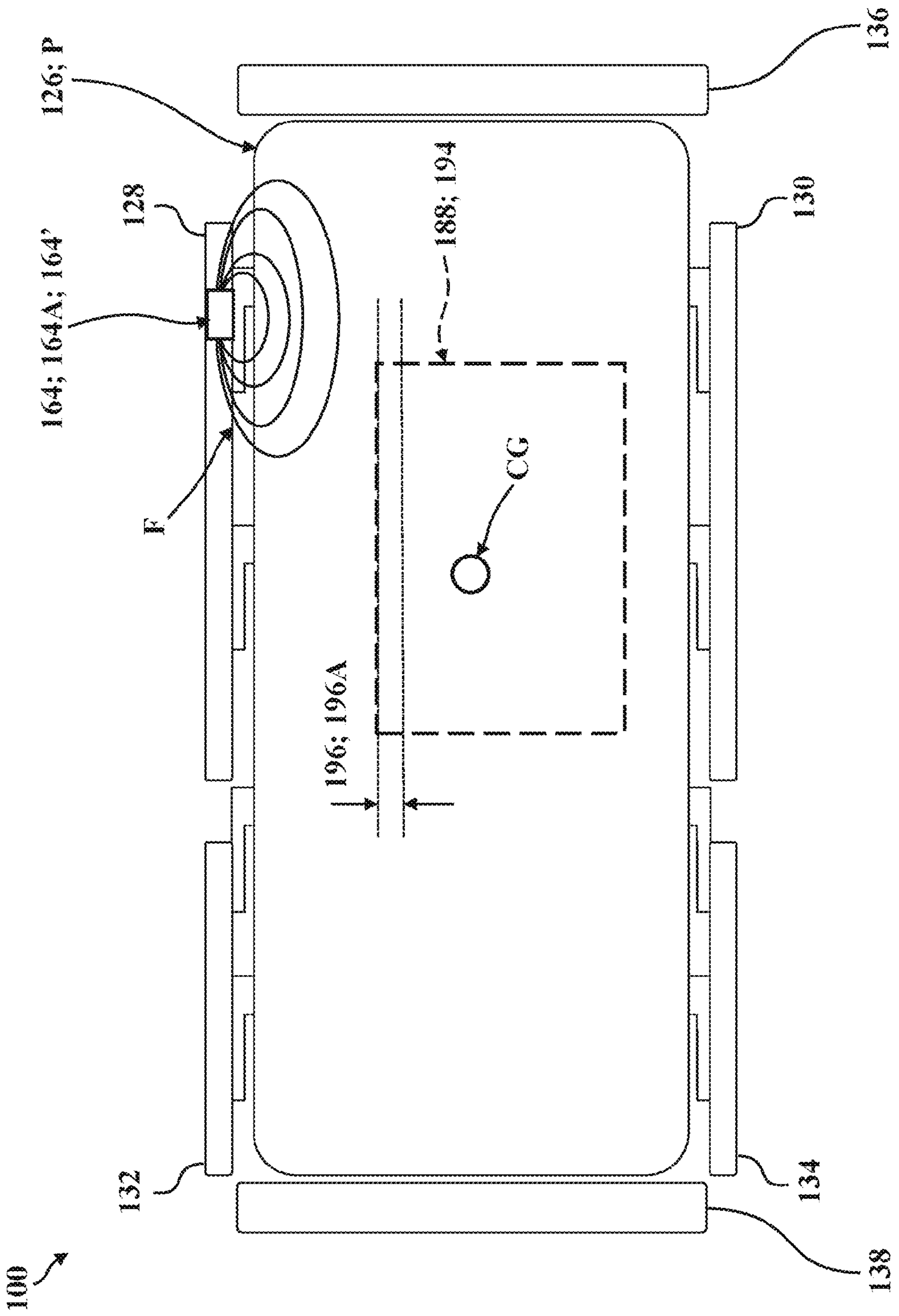
FIG. 8A is another top-side schematic view of the patient support apparatus of FIGS. 1-7, shown with the center of gravity indicia being inside the patient safety zone.
Figure 8B:
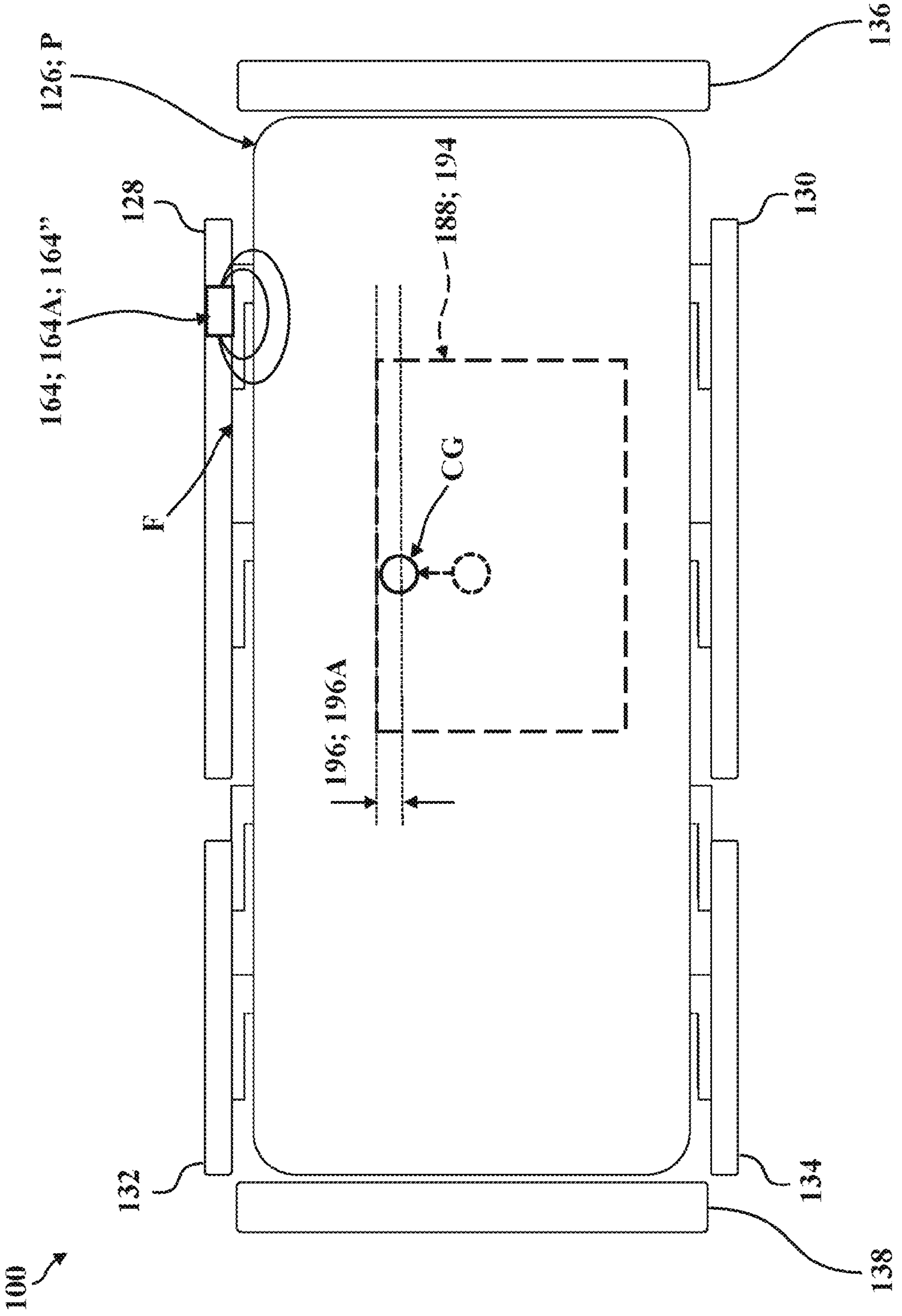
FIG. 8B is another top-side schematic view of the patient support apparatus of FIG. 8A, shown with the center of gravity indicia having moved while inside the patient safety zone with the electromagnetic field from the charging interface being reduced.
Figure 8C:
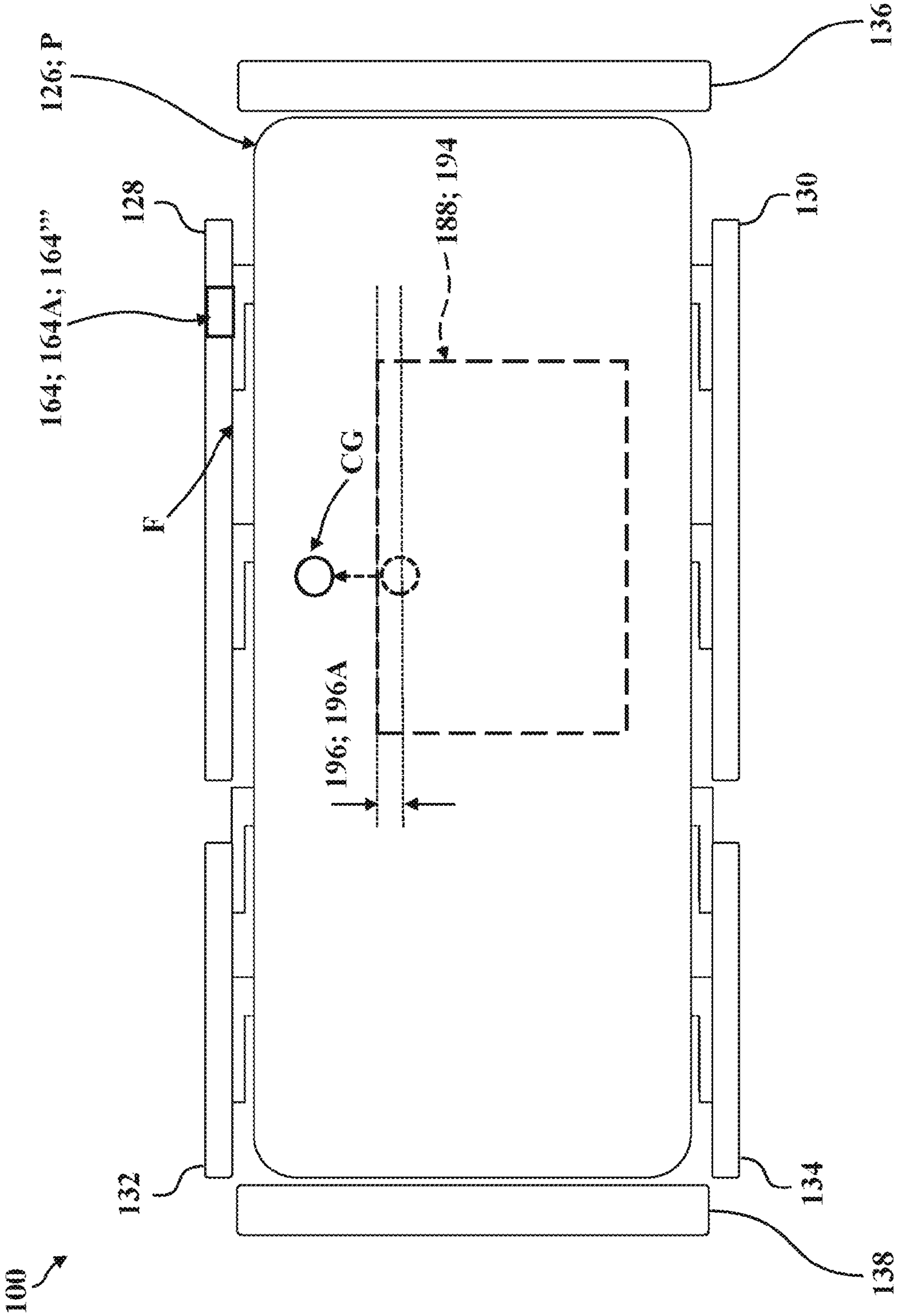
FIG. 8C is another top-side schematic view of the patient support apparatus of FIG. 8B, shown with the center of gravity indicia having moved outside the patient safety zone with the electromagnetic field from the charging interface being interrupted.
Figure 9:
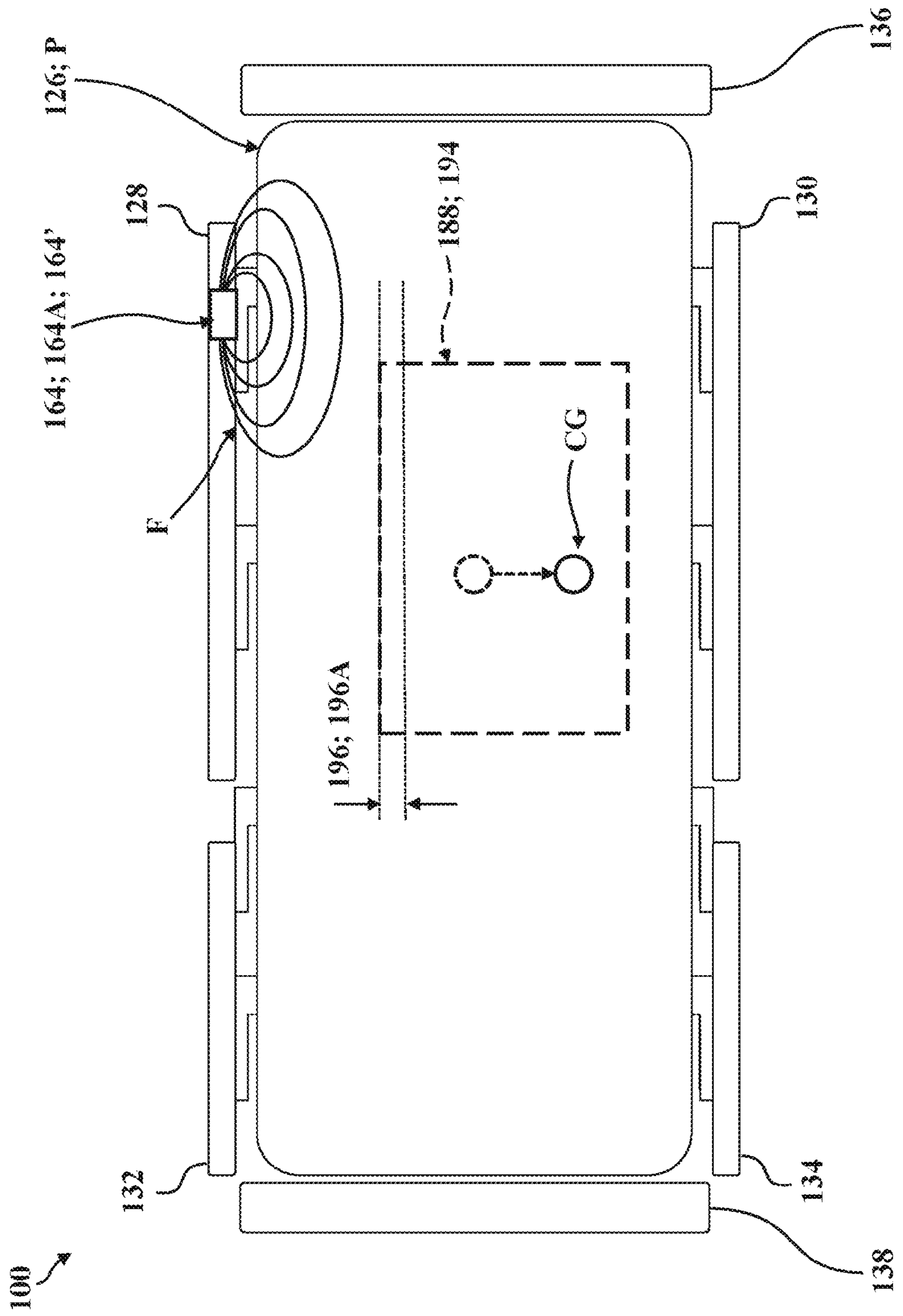
FIG. 9 is another top-side schematic view of the patient support apparatus of FIG. 8A, shown with the center of gravity indicia having moved closer to the patient safety zone with the electromagnetic field from the charging interface remaining the same.

According to one configuration, FIGS. 8A-9 illustrate operation of the of the charging interface 164, with FIG. 8A depicting the center of gravity indicia CG arranged within the patient safety zone 188 to illustrate a scenario where the patient is supported on the patient support surface 116 as determined via the sensor system 160 with the charging interface 164 operating in the first charge state 164'. In FIG. 8B, the center of gravity indicia CG is shown as having shifted closer to the peripheral edge 194 of the patient safety zone 188 within the patient safety distance 196 but still within the patient safety zone 188 to illustrate a scenario where the patient has shifted about the patient support surface 116 closer to the charging interface 164. Here, the controller 156 is configured to change operation of the charging interface 164 from the first charge state 164' to the second charge state 164'' to at least partially limit generation of the electromagnetic field F. In this way, the charging interface 164 can operate without potentially causing cross-interference. In FIG. 8C, the center of gravity indicia CG is shown as having shifted outside the patient safety zone 188 to illustrate a scenario where the patient has shifted about the patient support 116 even closer to the charging interface 164. Here, the controller 156 is configured to change operation of the charging interface 164 from the second charge state 164'' to the third charge state 164''' wherein the charging interface 164 interrupts generation of the electromagnetic field F. In this way, based on the patient's position, generation of the electromagnetic field F from the charging interface 164 is blocked or interrupted thereby preventing any cross-interference.

The charging interface 164 may operate in the third charge state 164''' for other reasons. For example, where the emitter 163 is a pacemaker in the patient, the controller 156 is configured to change the operation of the charging interface 164 to the third charge state 164''' to prevent any power transmission from the charging interface 164. This may be based on automatic sensing via the sensor system 160 or based on input received via the user interface 158 (e.g., entered by the caregiver). In another example, the charging interface 164 may not need to provide charging capabilities where the portable electronic device 168A is fully charged. In yet another example, the charging interface 164 may not need to provide charging capabilities during transport of the patient. Other configurations are contemplated.

In some versions, the controller 156 may be configured to change operation of the charging interface 164 from the third charge state 164''' to either the first or second charge state 164', 164'' in response to data D generated by the sensor system 160 indicating the sensed patient position is within the patient safety zone 188 after a predetermined period. In some versions, the predetermined period is adjustable via the user interface 158, such as by one or more input devices. This may, for example, allow the caregiver to adjust the predetermined period between intervals of time (e.g., from a longer period of time to a shorter period of time, vice-versa, and the like) such as to accommodate personal preferences, to compensate for changes in patient behavior or indicia, and the like. Other configurations are contemplated.

Although FIGS. 8A-8C depict a single charging interface 164 electrically coupled to the first caddy 174A relative to the first side rail 128, it will be appreciated that the patient support apparatus 100 may include any number of charging interfaces 164 electrically coupled to any caddy 174 or component of the patient support apparatus 100. For instance, as shown in FIG. 7, the patient support apparatus 100 includes two charging interfaces 164A, 162B one electrically coupled to the first caddy 174A and the other electronically coupled to the second caddy 174B, each operating in the first charge state 164'. Operation of the charging interface 164 may vary depending on the patient. For instance, in cases where the patient has an implantable device on one side of the patient's body (e.g., the right side), the charging interface 164 on the side of the patient support apparatus 100 closer to the implantable device operates between charge states to prevent any cross-interference between the charging interface 164 and the implantable device. In this case, even if the patient moves relative to the patient support surface 116 with the center of gravity indicia CG shifting towards the opposite side of the patient support surface 116 away from the charging interface 164, as shown in FIG. 9, the charging interface 164 may continue operating in the first charge state 164' without the risk of cross-interference.

Figure 10A:
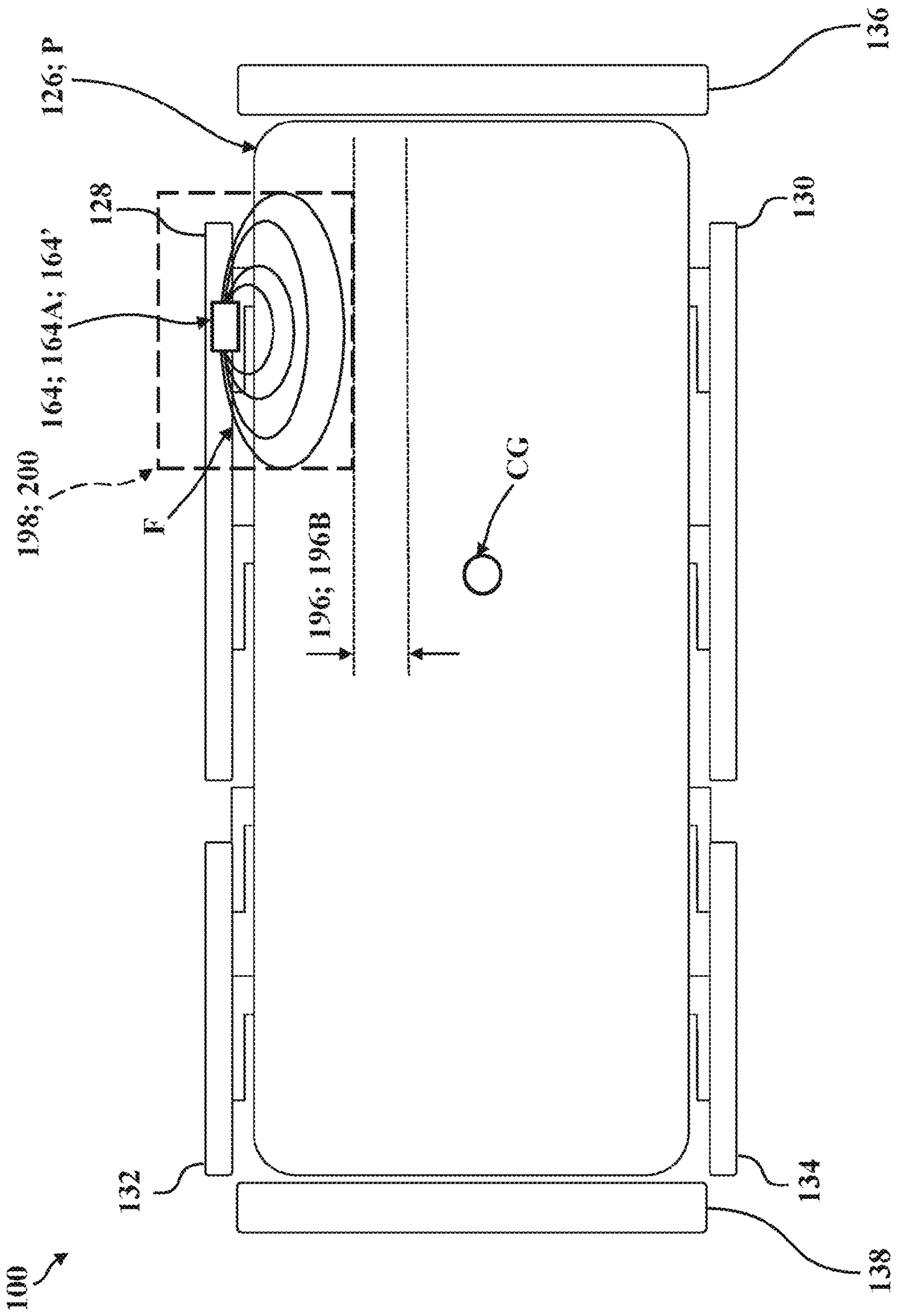
FIG. 10A is a top-side schematic view of the patient support apparatus of FIGS. 1-9, shown depicting an exemplary second patient safety zone defined relative to the charging interface, with an illustrative center of gravity indicia determined by the sensor system shown centered on the patient support surface and the charging interface generating an electromagnetic field.
Figure 10B:
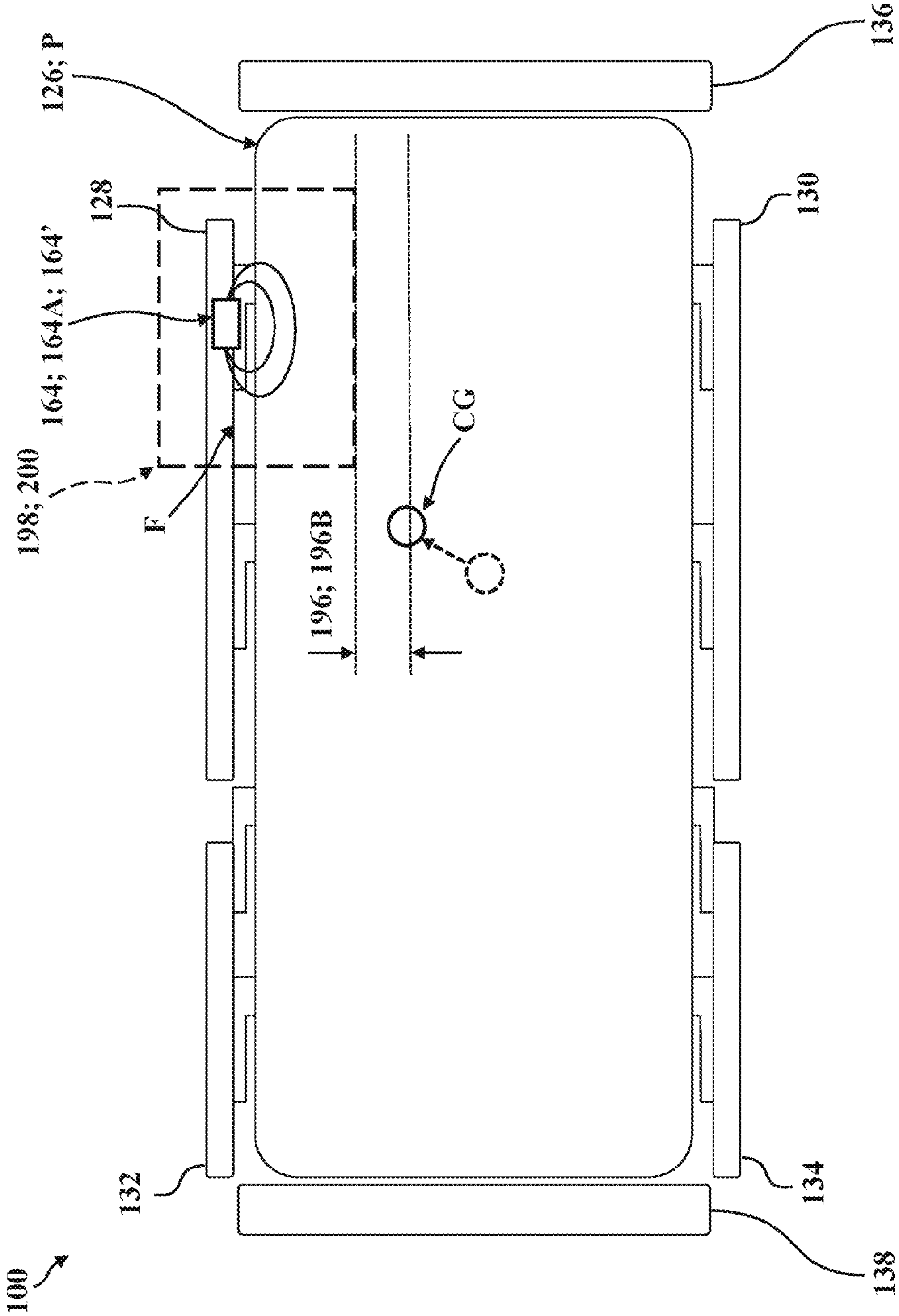
FIG. 10B is another top-side schematic view of the patient support apparatus of FIG. 10A, shown with the center of gravity indicia having moved closer to the second patient safety zone with the electromagnetic field from the charging interface being reduced.
Figure 10C:
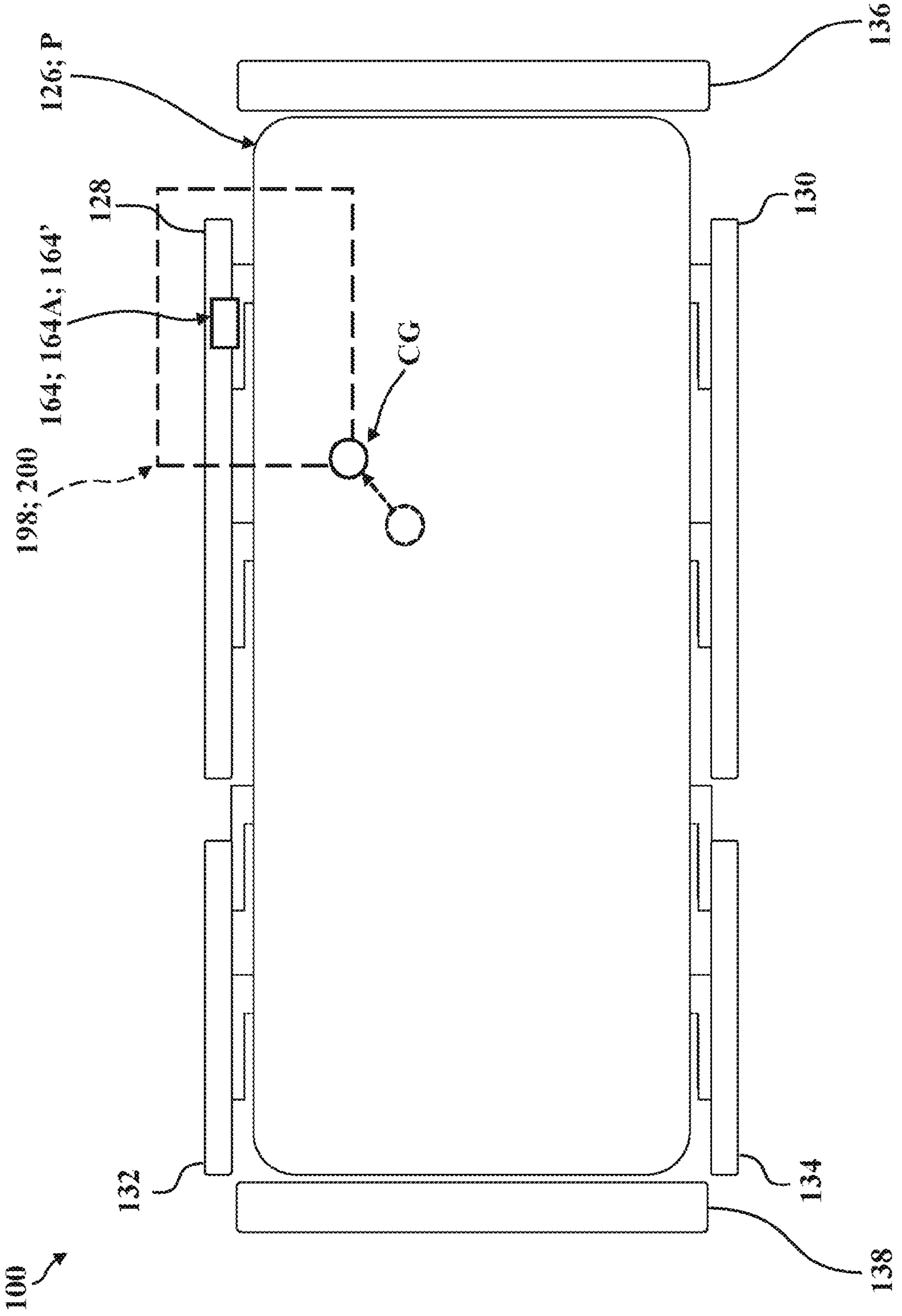
FIG. 10C is another top-side schematic view of the patient support apparatus of FIG. 10B, shown with the center of gravity indicia having moved within the second patient safety zone with the electromagnetic field from the charging interface being interrupted.

In some versions, as noted above, a second patient safety zone 188B is defined relative to the charging interface 164 with a second patient safety distance 196B measured outwardly from a peripheral edge 200 of the second patient safety zone 188B. FIGS. 10A-10C illustrate operation of the of the charging interface 164, with FIG. 10A depicting the center of gravity indicia CG arranged centered on the patient support surface 116 to illustrate a scenario where the patient is supported on the patient support surface 116 as determined via the sensor system 160 with the charging interface 164 operating in the first charge state 164'. In FIG. 10B, the center of gravity indicia CG is shown as having shifted closer to the peripheral edge 200 of the second patient safety zone 188B within the patient safety distance 196B to illustrate a scenario where the patient has shifted about the patient support surface 116 closer to the charging interface 164. Here, the risk of cross-interference is higher. Thus, the controller 156 is configured to change operation of the charging interface 164 from the first charge state 164' to the second charge state 164'' to at least partially limit generation of the electromagnetic field F. In this way, the charging interface 164 can operate without potentially causing cross-interference. In FIG. 10C, the center of gravity indicia CG is shown as having shifted inside the second patient safety zone 188B to illustrate a scenario where the patient has shifted about the patient support 116 even closer to the charging interface 164. Here, the controller 156 is configured to change operation of the charging interface 164 from the second charge state 164'' to the third charge state 163''' wherein the charging interface 164 interrupts generation of the electromagnetic field F. In this way, based on the patient's position, generation of the electromagnetic field F from the charging interface 164 is blocked or interrupted thereby preventing any cross-interference.

Figure 11A:
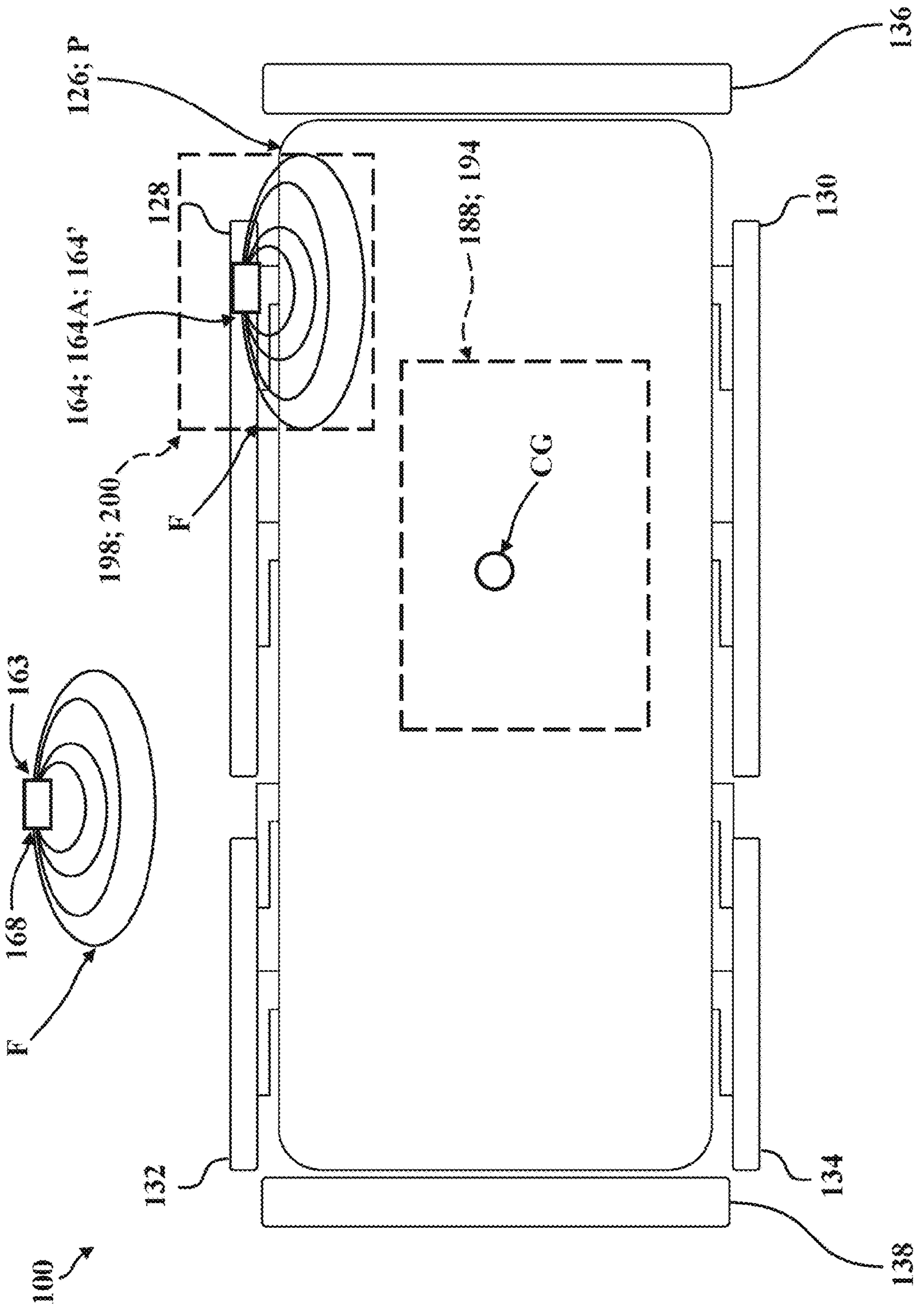
FIG. 11A is a top-side schematic view of the patient support apparatus of FIGS. 1-10C, shown depicting an exemplary first patient safety and second patient safety zones, with an illustrative center of gravity indicia determined by the sensor system shown centered on the patient support surface, a charging interface generating an electromagnetic field, and an emitter generating an electromagnetic field.
Figure 11B:
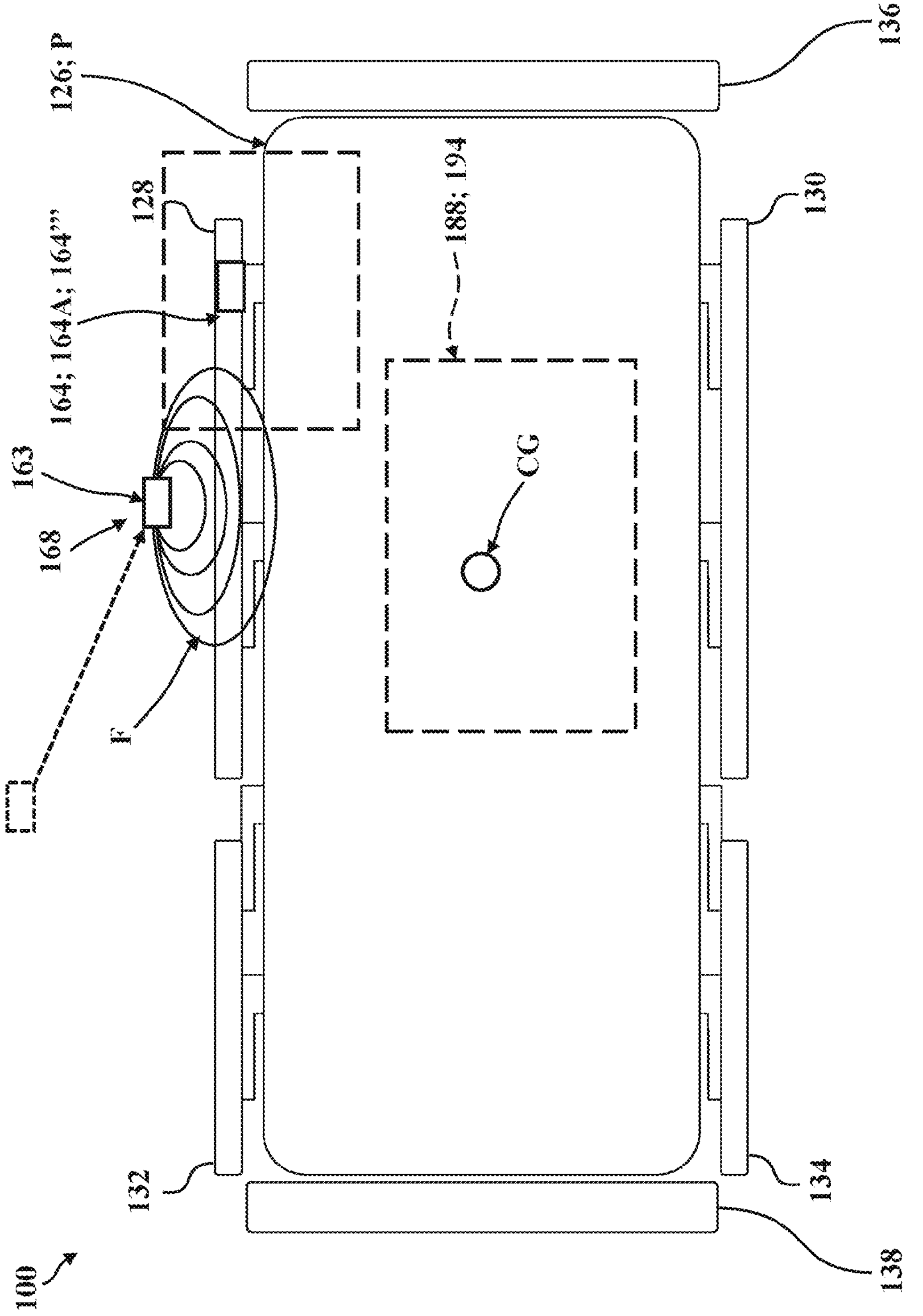
FIG. 11B is a top-side schematic view of the patient support apparatus of FIG. 11A, shown with the emitter having moved within the second patient safety zone with the electromagnetic field from the charging interface being reduced.

As noted above, remote devices 168 may be sensitive to electromagnetic fields F. Also noted above, the sensor system 160 includes the detector 160B configured for tracking the emitter 163 to sense positional changes of the emitter 163. As shown in FIGS. 11A-11B, in some versions, the emitter 163 may be attachable to a remote device 168. In this case, the emitter 163 is configured to generate a signal that is detectable by the detector 160B to detect positional changes of the remote device 168 relative to the charging interface 164. The controller 156 is configured to change the operation of the charging interface 164 between the first, second, and/or third charge states 164', 164'', 164''' in response to data generated by the sensor system 160. In some configurations, the controller 156 is configured to change operation of the charging interface 164 in response to at least partial movement and/or positional changes of the emitter 163 relative to the second patient safety 198 zone defined relative to the charging interface 164. In FIG. 11B, the remote device 168 is shown as having shifted closer to the charging interface 164 within the second patient safety zone 188B to illustrate a scenario where the remote device 168 has been moved closer to the patient and the charging interface 164. For example, in the event that the patient goes into sudden cardiac arrest, a caregiver may need to use a remote device such as a defibrillator to restore the patient's heartbeat. A cross-interference with the defibrillator and the charging interface can result in a failure to revive the patient due to the malfunction of the defibrillator.

The controller 156 may change operation of the charging interface 164 from either the first or second charge state 164', 164'' to the third charge state 164''' wherein generation of the electromagnetic field F is interrupted thereby interrupting the wireless charging of the portable electronic devices 168A, 168B in an emergency event where other electronic devices such as remote devices 168, powered devices 161, and the like need to be prioritized. In furtherance of the example provided above, in the emergency event that the patient goes into sudden cardiac arrest, which may be determined via the sensor system 160 (e.g., patient sensors like a heart monitor), and/or by caregiver engagement with the patient support apparatus 100 (e.g., hitting the "CPR" button or lever), the defibrillator and/or the powered devices 161 needs to be prioritized over providing wireless charging of portable electronic devices 168A, 168B. In this way, the external power source 157 and/or the battery back-up power supply 159 are prevented from providing power to the charging interfaces 164 and prioritize providing power to devices, such as the defibrillator and/or the powered devices 161, required during the emergency event.

As described herein, powering or charging of the portable electronic devices 168A, 168B, powered devices 161, or any external device can be used interchangeably. Many devices incorporate rechargeable batteries and require external power to charge these batteries for operation. However, in case of some devices, while the device is connected to power to charge its internal battery, the device can also be using power to operate simultaneously. The ratio of power used for charging the internal rechargeable battery to operating the device depends on the degree to which the battery is discharged, the power necessary to operate the device, and what the device is doing at any given time.

In some configurations, the control system 154 may further comprise one or more charging indicators 202 disposed in communication with the controller 156 and/or the charging interface 164 to provide the patient with feedback regarding the charge state of the portable electronic device 168A, 168B retained by the caddy 174. Here, the charging indicator 202 may comprise a visual indicator 204 (e.g., a light-emitting diode, a bulb, and the like), an audible indicator 206 (e.g., a speaker, a buzzer, and the like), or other types of indicators (e.g., a haptic indicator). Other configurations are contemplated. In some configurations, the controller 156 may activate the charging indicator 202 to communicate to the patient that their portable electronic device 168A, 168B retained by the caddy 174 is charging. For example, activation of the audible indicator 206 could result in a sound (e.g., a "ding") being generated to confirm to the patient that charging has been initiated. In some configurations, the visual indicator 204 could be operable between an off state 204F (e.g., an "off" condition not emitting light) to communicate to the patient that no charging is occurring and an on state 2040 (e.g., an "on" condition emitting light) to communicate to the patient that charging is underway. In some configurations, the controller 156 may activate the charging indicator 202 to communicate the charge state of the charging interface 164. For example, the visual indicator 204 may be operable between levels of light intensity to communicate between the first, second, and/or third charge states 164', 164", 164'". In another example, the audible indicator 206 could generate different sounds associated with particular charge states of the charging interface 164 to communicate the charge state of the charging interface 164. In some configurations, additional states may be employed to, for example, differentiate between charging efficiencies, the charged state of the portable electronic device 168A, 168B (e.g., determined based on power transfer), and the like, and may be affected in some configurations by using one or more single or multi-color light-emitting diodes to communicate different states via the emission of differently-colored light. Other configurations are contemplated.

In some configurations, the control system 154 is configured to issue an alert A1 in response to the sensor system 160 and/or the charging interface 164 to provide feedback to the patient and/or the caregiver. For example, the controller 156 may issue an alert A1 in response to the data D generated by the sensor system 160 indicating detection of a remote device 168, including the emitter 163, by the detector 160B. This way the caregiver is alerted in the case where there is a remote device 168 in an improper location relative to the charging interface 164 and the patient is also alerted that their portable electronic device 168A may not be charging. In another example, the controller 156 may issue an alert A1 in response to a change in operation of the charging interface 164 based on the sensed patient position via the sensor system 160 being outside the patient safety zone 188. In yet another example, the controller 156 may be configured to issue an alert A1 in response to the data generated by the sensor system 160 corresponding to a predetermined changes in the patient position relative to the patient safety zone 188. This way the caregiver is alerted in the case where the patient may not be property situated on the patient support surface 116, is actively moving around the patient support surface 116, or having a medical issue. In some versions, the alert A1 may be realized as an audible alert, such as a speaker, a beeper, or other device which generates an audible output. In some versions, the alert A1 may be realized as a visual alert, such as a light which illuminates, blinks, flashes, and the like, or some other device which generates a visual output. In some versions, the alert A1 may be both an audible alert and a visual alert (e.g., an icon or indicia presented on a screen of the user interface 158).

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A patient support apparatus comprising:
- a support structure including a patient support deck defining a patient support surface;
- a charging interface coupled to the support structure and being operable between:
  - a first charge state for charging portable electronic devices where the charging interface generates an electromagnetic field, and
  - a second charge state where the charging interface at least partially limits generation of the electromagnetic field;
- a sensor system coupled to the support structure to generate data representing changes in patient position on the support structure relative to a patient safety zone defined spaced from the charging interface; and
- a controller disposed in communication with the sensor system and the charging interface and configured to change operation of the charging interface from the first charge state to the second charge state in response to the data generated by the sensor system indicating a sensed patient position outside the patient safety zone to at least partially reduce the electromagnetic field based on the operation changes of the charging interface between the first charge state and the second charge state different from the first charge state.

II. The patient support apparatus of clause I, wherein the sensor system includes a plurality of load cells arranged to determine weight applied to the patient support surface.

III. The patient support apparatus of clause II, wherein the sensor system is further configured to monitor patient position based at least partially on an amount of weight applied to the patient support surface determined with the plurality of load cells and determine the sensed patient position based on the patient monitoring.

IV. The patient support apparatus of clause III, wherein the controller is further configured to change operation of the charging interface in response to the sensed patient position as determined with the plurality of load cells.

V. The patient support apparatus of any of clauses II-IV, wherein the controller is further configured to define the patient safety zone based at least partially on an amount of weight applied to the patient support surface determined with the plurality of load cells.

VI. The patient support apparatus of any of clauses I-V, wherein the sensor system includes a proximity sensor in communication with the controller to monitor patient position relative to the patient support surface; and wherein the sensed patient position is based at least partially on data generated by the proximity sensor.

VII. The patient support apparatus of clause VI, wherein the controller is further configured to change operation of the charging interface from the first charge state to the second charge state in response to the sensed patient position determined with the proximity sensor.

VIII. The patient support apparatus of any of clauses I-VII, wherein the sensor system includes a detector configured for tracking an emitter attachable to the patient to sense positional changes of the patient; and wherein the controller is further configured to change operation of the charging interface in response to positional changes of the patient as determined with the detector.

IX. The patient support apparatus of any of clauses I-VIII, wherein the sensor system includes one or more load cells, an optical sensor, and a camera.

X. The patient support apparatus of any of clauses I-IX, wherein the controller is configured to continue operation of the charging interface in the first charge state based on the sensed patient position being within the patient safety zone as determined by the sensor system.

XI. The patient support apparatus of any of clauses I-X, wherein the controller is configured to change operation of the charging interface to a third charge state where the charging interface interrupts generation of the electromagnetic field.

XII. The patient support apparatus of clause XI, wherein the controller is further configured to evaluate patient data relative to a predetermined patient condition; and wherein the controller is configured to change operation of the charging interface to at least one of the second charge state and the third charge state based on the evaluation of the patient data relative to the predetermined patient condition.

XIII. The patient support apparatus of any of clauses I-XII, wherein the controller is further configured to determine a patient safety distance between the sensed patient position and a periphery of the patient safety zone wherein the controller changes the operation of the charging interface to at least partially limit generation of the electromagnetic field based on the patient safety distance.

XIV. The patient support apparatus of clause XIII, wherein the patient safety distance is decreased between the sensed patient position and the periphery of the patient safety zone, the charging interface reduces generation of the electromagnetic field, and wherein the patient safety distance is increased between the sensed patient position and the periphery of the patient safety zone, the charging interface increases generation of the electromagnetic field.

XV. The patient support apparatus of any of clauses XIII-XIV, further comprising a user interface arranged for user engagement; and wherein at least one of the patient safety distance and the periphery of the patient safety zone is adjustable via the user interface.

XVI. The patient support apparatus of any of clauses I-XV, further comprising a user interface arranged for user engagement; and wherein the patient safety zone is adjustable via the user interface.

XVII. The patient support apparatus of any of clauses I-XVI, further comprising a user interface configured to receive input from a user, the user interface comprising a screen coupled to the support structure, the screen being configured to display visual content related to the patient, and an input device to generate an input signal in response to receiving user input.

XVIII. The patient support apparatus of clause XVII, wherein the input device is in communication with the controller, the controller being configured to change operation of the charging interface in response to receiving the input signal from the input device.

XIX. The patient support apparatus of any of clauses I-XVIII, wherein the sensor system includes an emitter, and a detector coupled to the controller, the emitter configured to generate a signal that is detectable by the detector to detect positional changes of the emitter; and wherein the controller is further configured to change operation of the charging interface in response to positional changes of the emitter as determined with the detector.

XX. The patient support apparatus of clause XIX, wherein the controller is further configured to change operation of the charging interface in response to at least partial movement of the emitter relative to a second patient safety zone defined relative to the charging interface.

XXI. The patient support apparatus of clause XX, wherein the controller is further configured to change operation of the charging interface to a third charge state where the charging interface interrupts generation of the electromagnetic field in response to at least partial movement of the emitter being within the second patient safety zone as determined with the detector.

XXII. The patient support apparatus of any of clauses XX-XXI, wherein the controller further configured to issue an alert in response to the data generated by the sensor system indicating detection of the emitter by the detector.

XXIII. The patient support apparatus of any of clauses I-XXII, wherein the controller further configured to issue an alert in response to a change in operation of the charging interface based on the sensed patient position being outside of the patient safety zone.

XXIV. The patient support apparatus of any of clauses I-XXIII, wherein the controller further configured to issue an alert in response to the data generated by the sensor system corresponding to predetermined changes in the patient position relative to the patient safety zone.

XXV. The patient support apparatus of any of clauses I-XXIV, wherein the support structure includes a base arranged for movement over floor surfaces, and a lift mechanism interposed between the base and the patient support deck to move the patient support deck relative to the base;

wherein the sensor system further includes a motion sensor operatively attached to the support structure to determine movement of the base along floor surfaces; and wherein the controller is further configured to change operation of the charging interface to the second charge state in response to movement of the base along floor surfaces determined by the motion sensor.

XXVI. The patient support apparatus of any of clauses I-XXV, further comprising one or more powered devices to perform one or more powered functions of the patient support apparatus; and wherein the controller is disposed in communication with the one or more powered devices and is configured to change operation of the charging interface to the second charge state during operation of the one or more powered devices to perform the one or more powered functions.

XXVII. The patient support apparatus of clause XXVI, further comprising a battery for providing power to the one or more powered devices, and a bed charger in electrical communication with the battery and having a tether for attaching to a main power source to charge the battery; and wherein the controller is further configured to change operation of the charging interface to the second charge state in response to detachment of the tether from the main power source.

XXVIII. The patient support apparatus of any of clauses I-XXVII, further comprising side rails coupled to the support structure, wherein the charging interface is coupled to one of the side rails.

XXIX. A patient support apparatus comprising:

a support structure including a patient support deck defining a patient support surface;

a charging interface coupled to the support structure and being operable between:

a first charge state for charging portable electronic devices where the charging interface generates an electromagnetic field, and a second charge state where the charging interface at least partially limits generation of the electromagnetic field;

a third charge state where the charging interface interrupts generation of the electromagnetic field;

a sensor system coupled to the support structure to generate data representing changes in patient position on the support structure relative to a patient safety zone defined spaced from the charging interface; and a controller disposed in communication with the sensor system and the charging interface and configured to change operation of the charging interface from the first charge state to the third charge state in response to the data generated by the sensor system indicating a sensed patient position outside the patient safety zone to interrupt the electromagnetic field based on the operation changes of the charging interface between the first charge state and the third charge state different from the first charge state.

XXX. The patient support apparatus of clause XXIX, wherein the controller is further configured to determine a patient safety distance between the sensed patient position and a periphery of the patient safety zone wherein the controller changes the operation of the charging interface from the first charge state to the second charge state to at least partially limit generation of the electromagnetic field based on the patient safety distance.

What is claimed is:

1. A patient support apparatus comprising:

a support structure including a patient support deck defining a patient support surface;

a charging interface coupled to the support structure and being operable between:

a first charge state for charging portable electronic devices where the charging interface generates an electromagnetic field, and a second charge state where the charging interface at least partially limits generation of the electromagnetic field;

a sensor system coupled to the support structure to generate data representing changes in patient position on the support structure relative to a patient safety zone defined spaced laterally away from the charging interface about the patient support surface; and a controller disposed in communication with the sensor system and the charging interface and configured to change operation of the charging interface from the first charge state to the second charge state in response to the data generated by the sensor system indicating a sensed patient position on the patient support surface but outside of the patient safety zone to at least partially reduce the electromagnetic field based on the operation changes of the charging interface between the first charge state and the second charge state different from the first charge state.

2. The patient support apparatus of claim 1, wherein the sensor system includes a plurality of load cells arranged to determine weight applied to the patient support surface;

wherein the sensor system is further configured to monitor patient position based at least partially on an amount of weight applied to the patient support surface determined with the plurality of load cells and determine the sensed patient position based on the patient monitoring; and wherein the controller is further configured to change operation of the charging interface in response to the sensed patient position as determined with the plurality of load cells.

3. The patient support apparatus of claim 1, wherein the sensor system includes a plurality of load cells arranged to determine weight applied to the patient support surface; and wherein the controller is further configured to define the patient safety zone based at least partially on an amount of weight applied to the patient support surface determined with the plurality of load cells.

4. The patient support apparatus of claim 1, wherein the sensor system includes a proximity sensor in communication with the controller to monitor patient position relative to the patient support surface;

wherein the sensed patient position is based at least partially on data generated by the proximity sensor; and wherein the controller is further configured to change operation of the charging interface from the first charge state to the second charge state in response to the sensed patient position determined with the proximity sensor.

5. The patient support apparatus of claim 1, wherein the sensor system includes a detector configured for tracking an emitter attachable to the patient to sense positional changes of the patient; and wherein the controller is further configured to change operation of the charging interface in response to positional changes of the patient as determined with the detector.

6. The patient support apparatus of claim 1, wherein the sensor system includes one or more load cells, an optical sensor, and a camera.

7. The patient support apparatus of claim 1, wherein the controller is configured to continue operation of the charging interface in the first charge state based on the sensed patient position being within the patient safety zone as determined by the sensor system.

8. The patient support apparatus of claim 1, wherein the controller is configured to change operation of the charging interface to a third charge state where the charging interface interrupts generation of the electromagnetic field;

wherein the controller is further configured to evaluate patient data relative to a predetermined patient condition; and wherein the controller is configured to change operation of the charging interface to at least one of the second charge state and the third charge state based on the evaluation of the patient data relative to the predetermined patient condition.

9. The patient support apparatus of claim 1, wherein the controller is further configured to determine a patient safety distance between the sensed patient position and a periphery of the patient safety zone wherein the controller changes the operation of the charging interface to at least partially limit generation of the electromagnetic field based on the patient safety distance;

wherein the patient safety distance is decreased between the sensed patient position and the periphery of the patient safety zone, the charging interface reduces generation of the electromagnetic field, and wherein the patient safety distance is increased between the sensed patient position and the periphery of the patient safety zone, the charging interface increases generation of the electromagnetic field.

10. The patient support apparatus of claim 1, further comprising a user interface arranged for user engagement;

wherein the controller is further configured to determine a patient safety distance between the sensed patient position and a periphery of the patient safety zone wherein the controller changes the operation of the charging interface to at least partially limit generation of the electromagnetic field based on the patient safety distance; and wherein at least one of the patient safety distance and the periphery of the patient safety zone is adjustable via the user interface.

11. The patient support apparatus of claim 1, further comprising a user interface arranged for user engagement; and wherein the patient safety zone is adjustable via the user interface.

12. The patient support apparatus of claim 1, further comprising a user interface configured to receive input from a user, the user interface comprising a screen coupled to the support structure, the screen being configured to display visual content related to the patient, and an input device to generate an input signal in response to receiving user input; and wherein the input device is in communication with the controller, the controller being configured to change operation of the charging interface in response to receiving the input signal from the input device.

13. The patient support apparatus of claim 1, wherein the sensor system includes an emitter, and a detector coupled to the controller, the emitter configured to generate a signal that is detectable by the detector to detect positional changes of the emitter; and wherein the controller is further configured to change operation of the charging interface in response to positional changes of the emitter as determined with the detector, to change operation of the charging interface in response to at least partial movement of the emitter relative to a second patient safety zone defined relative to the charging interface; and to change operation of the charging interface to a third charge state where the charging interface interrupts generation of the electromagnetic field in response to at least partial movement of the emitter being within the second patient safety zone as determined with the detector.

14. The patient support apparatus of claim 1, wherein the sensor system includes an emitter, and a detector coupled to the controller, the emitter configured to generate a signal that is detectable by the detector to detect positional changes of the emitter; and wherein the controller is further configured to change operation of the charging interface in response to positional changes of the emitter as determined with the detector, to change operation of the charging interface in response to at least partial movement of the emitter relative to a second patient safety zone defined relative to the charging interface, and to issue an alert in response to the data generated by the sensor system indicating detection of the emitter by the detector.

15. The patient support apparatus of claim 1, wherein the controller is further configured to issue an alert in response to a change in operation of the charging interface based on the sensed patient position being outside of the patient safety zone.

16. The patient support apparatus of claim 1, wherein the controller is further configured to issue an alert in response to the data generated by the sensor system corresponding to predetermined changes in the patient position relative to the patient safety zone.

17. The patient support apparatus of claim 1, wherein the support structure includes a base arranged for movement over floor surfaces, and a lift mechanism interposed between the base and the patient support deck to move the patient support deck relative to the base;

wherein the sensor system further includes a motion sensor operatively attached to the support structure to determine movement of the base along floor surfaces; and wherein the controller is further configured to change operation of the charging interface to the second charge state in response to movement of the base along floor surfaces determined by the motion sensor.

18. The patient support apparatus of claim 1, further comprising:

one or more powered devices to perform one or more powered functions of the patient support apparatus, a battery for providing power to the one or more powered devices, and a bed charger in electrical communication with the battery and having a tether for attaching to a main power source to charge the battery;

wherein the controller is disposed in communication with the one or more powered devices and is configured to change operation of the charging interface to the second charge state during operation of the one or more powered devices to perform the one or more powered functions; and wherein the controller is further configured to change operation of the charging interface to the second charge state in response to detachment of the tether from the main power source.

19. A patient support apparatus comprising:

a support structure including a patient support deck defining a patient support surface;

a charging interface coupled to the support structure and being operable between:

a first charge state for charging portable electronic devices where the charging interface generates an electromagnetic field, a second charge state where the charging interface at least partially limits generation of the electromagnetic field, and a third charge state where the charging interface interrupts generation of the electromagnetic field;

a sensor system coupled to the support structure to generate data representing changes in patient position on the support structure relative to a patient safety zone defined spaced laterally from the charging interface about the patient support surface; and a controller disposed in communication with the sensor system and the charging interface and configured to change operation of the charging interface from the first charge state to the third charge state in response to the data generated by the sensor system indicating a sensed patient position on the patient support surface but outside of the patient safety zone to interrupt the electromagnetic field based on the operation changes of the charging interface between the first charge state and the third charge state different from the first charge state.

20. The patient support apparatus of claim 19, wherein the controller is further configured to determine a patient safety distance between the sensed patient position and a periphery of the patient safety zone wherein the controller changes the operation of the charging interface from the first charge state to the second charge state to at least partially limit generation of the electromagnetic field based on the patient safety distance.

* * * * *